US012627660B2

(12) United States Patent
Krishnan

(10) Patent No.: US 12,627,660 B2
(45) Date of Patent: May 12, 2026

(54) CROSS-ORIGIN RESOURCE HANDLING FOR WEB CONTENT

(71) Applicant: Citrix Systems, Inc., Fort Lauderdale, FL (US)

(72) Inventor: Subramanian Krishnan, Bangalore (IN)

( * ) Notice: Subject to any disclaimer, the term of this patent is extended or adjusted under 35 U.S.C. 154(b) by 461 days.

(21) Appl. No.: 17/739,271

(22) Filed: May 9, 2022

(65) Prior Publication Data

US 2023/0362160 A1     Nov. 9, 2023

(51) Int. Cl.
  H04L 9/40       (2022.01)
  H04L 67/02      (2022.01)
(52) U.S. Cl.
  CPC ...... H04L 63/0876 (2013.01); H04L 63/0236 (2013.01); H04L 63/20 (2013.01); H04L 67/02 (2013.01)
(58) Field of Classification Search
  None
  See application file for complete search history.

(56) References Cited

U.S. PATENT DOCUMENTS

| | | | | | |
|---|---|---|---|---|---|
| 7,984,170 | B1 * | 7/2011 | Shalla | ..................... | G06F 9/545 |
| | | | | | 709/225 |
| 8,667,573 | B2 * | 3/2014 | Lawrence | ............... | H04L 67/02 |
| | | | | | 380/279 |
| 10,084,794 | B2 * | 9/2018 | Goldfarb | ................. | H04L 63/08 |

| | | | | | |
|---|---|---|---|---|---|
| 10,827,023 | B1 * | 11/2020 | Yan | ........................ | H04L 67/535 |
| 11,582,131 | B2 * | 2/2023 | Chauhan | ................. | H04L 63/08 |
| 11,658,822 | B1 * | 5/2023 | Engers | .................... | H04L 65/61 |
| | | | | | 713/168 |
| 2008/0178264 | A1 * | 7/2008 | Keohane | ............... | H04L 9/3226 |
| | | | | | 726/3 |
| 2009/0049557 | A1 * | 2/2009 | Friedman | ................ | H04L 67/06 |
| | | | | | 726/27 |
| 2010/0251270 | A1 * | 9/2010 | Dale | ...................... | G06F 9/5011 |
| | | | | | 719/328 |
| 2014/0157369 | A1 * | 6/2014 | Mischook | ............. | H04L 63/102 |
| | | | | | 726/4 |
| 2015/0143223 | A1 * | 5/2015 | Kolam | ................... | H04L 69/329 |
| | | | | | 715/234 |
| 2015/0143467 | A1 * | 5/2015 | Hebert | ................ | H04L 63/0807 |
| | | | | | 726/4 |
| 2015/0180846 | A1 * | 6/2015 | Nguyen | ................... | G06F 21/41 |
| | | | | | 726/7 |
| 2020/0065505 | A1 * | 2/2020 | Wall | ........................ | H04L 51/04 |
| 2020/0137120 | A1 * | 4/2020 | Frisbie | .................... | H04L 67/34 |
| 2022/0035613 | A1 * | 2/2022 | Wada | ..................... | G06F 21/51 |

* cited by examiner

*Primary Examiner* — Lashonda Jacobs-Burton

(57) ABSTRACT

One disclosed method involves receiving, by a browser and from a first origin, preauthorization data identifying a plurality of other origins that are permitted to send instructions to the browser that cause the browser to access one or more resources at the first origin, determining, by the browser, that data received from a second origin includes a first instruction to access a first resource at the first origin, determining, by the browser, that the second origin is included among the plurality of other origins identified by the preauthorization data, and accessing, by the browser and based at least in part on the second origin being included among the plurality of other origins, the first resource at the first origin based on the first instruction.

16 Claims, 15 Drawing Sheets

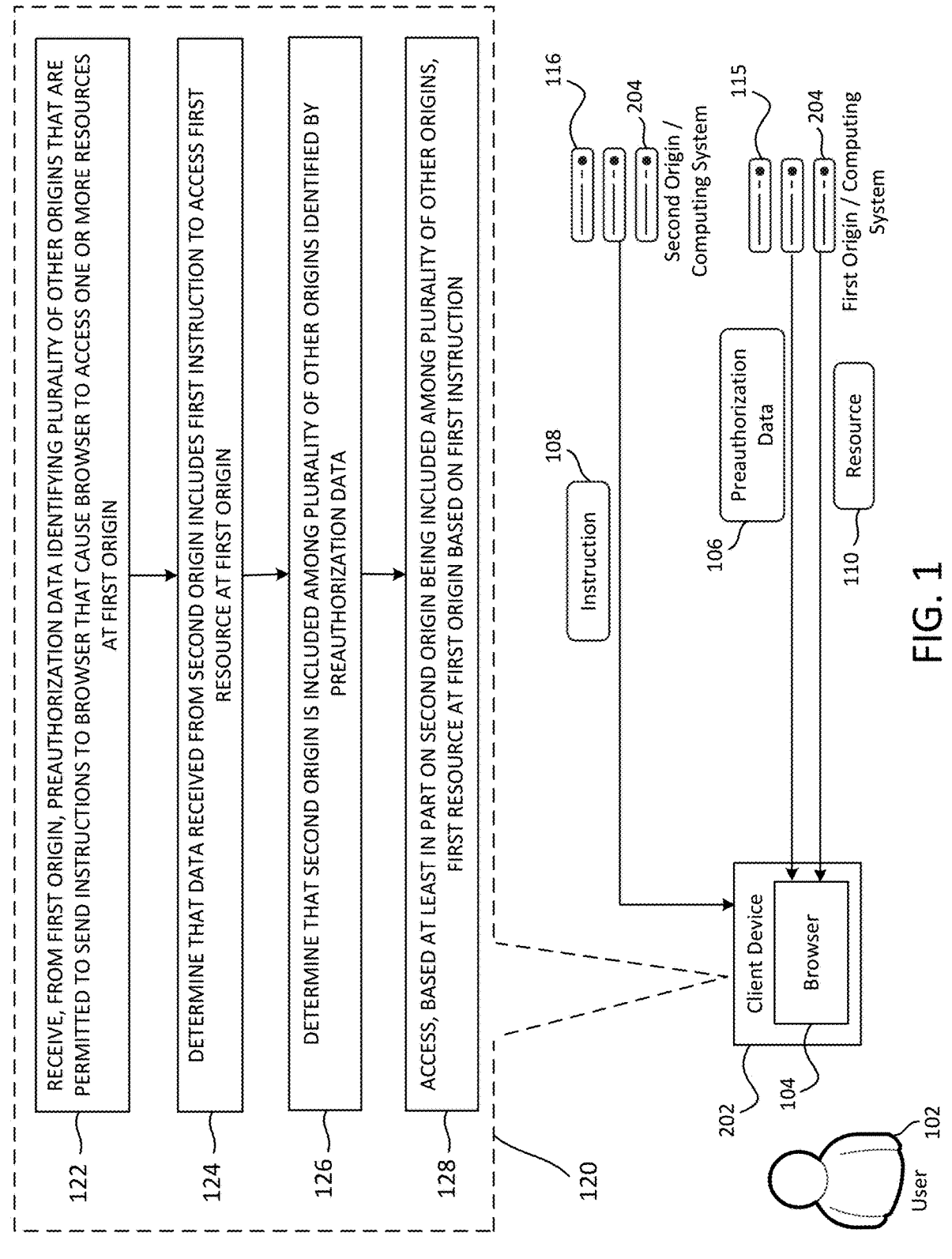

122 — RECEIVE, FROM FIRST ORIGIN, PREAUTHORIZATION DATA IDENTIFYING PLURALITY OF OTHER ORIGINS THAT ARE PERMITTED TO SEND INSTRUCTIONS TO BROWSER THAT CAUSE BROWSER TO ACCESS ONE OR MORE RESOURCES AT FIRST ORIGIN

124 — DETERMINE THAT DATA RECEIVED FROM SECOND ORIGIN INCLUDES FIRST INSTRUCTION TO ACCESS FIRST RESOURCE AT FIRST ORIGIN

126 — DETERMINE THAT SECOND ORIGIN IS INCLUDED AMONG PLURALITY OF OTHER ORIGINS IDENTIFIED BY PREAUTHORIZATION DATA

128 — ACCESS, BASED AT LEAST IN PART ON SECOND ORIGIN BEING INCLUDED AMONG PLURALITY OF OTHER ORIGINS, FIRST RESOURCE AT FIRST ORIGIN BASED ON FIRST INSTRUCTION

120

116
204
Second Origin / Computing System 115
204
First Origin / Computing System 108
Instruction 106
Preauthorization Data 110
Resource 202
Client Device
104
Browser 102
User

FIG. 1

CROSS-ORIGIN RESOURCE HANDLING FOR WEB CONTENT

BACKGROUND

Data and web content hosted by a server, a domain, etc., can be accessed using browsers. Various systems have been developed that allow client devices to access applications, web applications, and/or data files over a network. Certain products offered by Citrix Systems, Inc. of Fort Lauderdale, FL, including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may involve receiving, by a browser and from a first origin, preauthorization data identifying a plurality of other origins that are permitted to send instructions to the browser that cause the browser to access one or more resources at the first origin, determining, by the browser, that data received from a second origin includes a first instruction to access a first resource at the first origin, determining, by the browser, that the second origin is included among the plurality of other origins identified by the preauthorization data, and accessing, by the browser and based at least in part on the second origin being included among the plurality of other origins, the first resource at the first origin based on the first instruction.

In some of the disclosed embodiments, a system may comprise at least one processor, and at least one computer-readable medium encoded with instructions which, when executed by the at least one processor, cause the system to receive, by a browser and from a first origin, preauthorization data identifying a plurality of other origins that are permitted to send instructions to the browser that cause the browser to access one or more resources at the first origin, determine, by the browser, that data received from a second origin includes a first instruction to access a first resource at the first origin, determine, by the browser, that the second origin is included among the plurality of other origins identified by the preauthorization data, and access, by the browser and based at least in part on the second origin being included among the plurality of other origins, the first resource at the first origin based on the first instruction.

In some of the disclosed embodiments, at least one non-transitory computer-readable medium may be encoded with instructions which, when executed by at least one processor of a system, cause the system to receive, by a browser and from a first origin, preauthorization data identifying a plurality of other origins that are permitted to send instructions to the browser that cause the browser to access one or more resources at the first origin, determine, by the browser, that data received from a second origin includes a first instruction to access a first resource at the first origin, determine, by the browser, that the second origin is included among the plurality of other origins identified by the preauthorization data, and access, by the browser and based at least in part on the second origin being included among the plurality of other origins, the first resource at the first origin based on the first instruction.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1 shows an example implementation of a system using Cross-Origin Resource Sharing (CORS) preauthorization data for enabling access to cross-origin resources, in accordance with some embodiments of the present disclosure;

DETAILED DESCRIPTION

Figure 2:
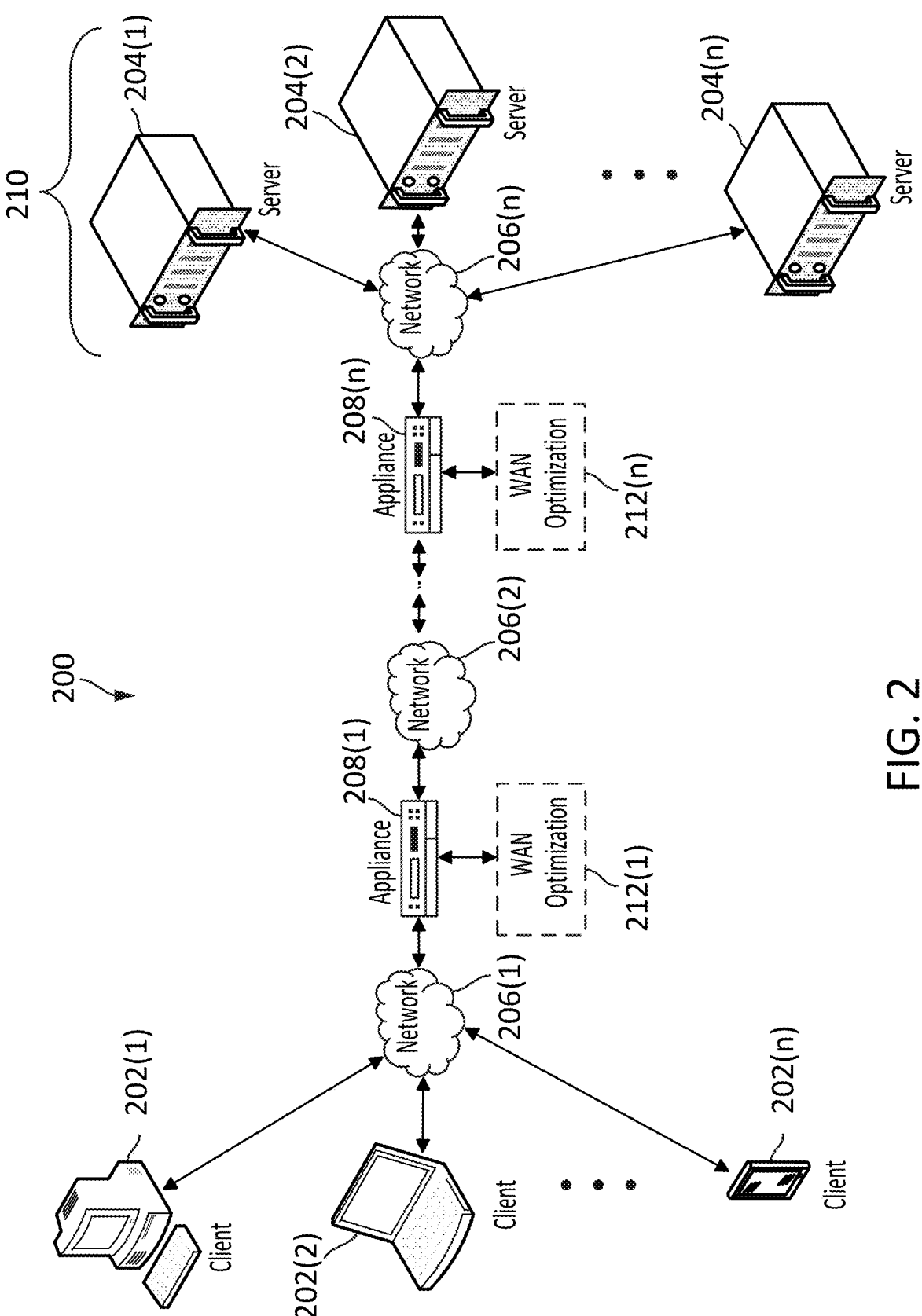
FIG. 2 is a diagram of a network environment in which some embodiments of the novel systems and methods disclosed herein may deployed.

For purposes of reading the description below of the various embodiments, the following descriptions of the sections of the specification and their respective contents may be helpful:

Section A provides an introduction to example embodiments of a system using CORS preauthorization data for enabling access to cross-origin resources;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system introduced in Section A; and Section G describes example implementations of methods, systems/devices, and computer-readable media in accordance with the present disclosure.

A. Introduction to Illustrative Embodiments of a System Using CORS Preauthorization Data for Enabling Access to Cross-Origin Resources The "origin" of an item of web content is typically defined by the scheme (protocol), hostname (domain), and port of the uniform resource locator (URL) used to access it. Two items of web content are thus generally considered to have the same origin only when the same scheme, hostname, and port are used to access them. A web page may embed "cross-origin" (e.g., hosted by another domain) images, videos, stylesheets, scripts, HTML elements, etc. Certain cross-origin requests may be forbidden by an origin. Cross-Origin Resource Sharing (CORS) defines a way in which a browser and an origin server can interact to determine whether a cross-origin request is to be allowed from a particular origin.

CORS is a mechanism that allows a resource server to indicate origins (domain, scheme, or port) other than its own from which web pages running in a browser should be permitted to load resources. Conventional CORS techniques rely on a mechanism in which browsers make a "pre-flight" request to the server hosting the cross-origin resource, in order to confirm that the server will permit a request to load a resource by the browser. The server responds to the pre-flight request by evaluating the origin of the request.

The primary reason for using CORS is for security and preventing Cross-Site Request Forgery (CSRF) attacks. In a CSRF attack, a malicious script from a malicious site attempts to access/modify the resources at the server by using the authenticated user session information (e.g., cookies) from a browser without the knowledge and consent of the user. CORS effectively solves the security problem by using a pre-flight request to check if the access will be allowed before making the actual request.

The inventor of the present disclosure has recognized and appreciated that the conventional CORS mechanism of sending a pre-flight request (before sending the actual request to load a resource) can create a performance problem. Web applications are often implemented with the frontend/user interface being served from a different domain and the backend/APIs being served from a different domain. As an example, the web application could be hosted at "https://myapp.abc.com" and the APIs could be hosted at "https://api.abc.com." The reasons for doing this includes decoupling the frontend and backend, and also to have a common set of APIs which can be used by both first-party and third-party applications, web applications, and native applications.

Since, the web application and the APIs do not have the same domain, CORS comes into the picture, which means for each cross-origin resource request to the server, there is a pre-flight request sent by the browser before the actual request is made. This means that there is a round-trip of request and processing occurring on the server and the client device/browser for these pre-flight requests, which can add to latency and reduce the web application's responsiveness. This "price" is paid even though the web application is a legitimate and first-party application.

In some cases, the performance problem can be avoided by having the same domain for the web application and the APIs. This avoids CORS but creates a constraint for the API domain. Moreover, CORS is still triggered when a trusted third-party web application attempts to access resources at the API domain.

The other approach taken to optimize CORS pre-flight requests is allowing the responses to the pre-flight requests to be cached for a period of time. The challenge with this approach is that it still requires an initial pre-flight request for each resource and new origin, and there are limits imposed by different browsers for how long the cache is maintained. Therefore, at most the frequency of pre-flight requests can be reduced but not avoided.

The last workaround is using a browser plugin to disable CORS. This would disable all CORS pre-flight requests from the browser, which creates a security issue and may not be acceptable for production use.

The inventor of the present disclosure has recognized and appreciated that the above-noted alternatives to the CORS pre-flight requests are not ideal. The present disclosure offers a solution to the performance problem of the CORS pre-flight requests by introducing a new resource, referred to herein as a "CORS preauthorization map." An origin, hosting one or more resources, can define and make available a CORS preauthorization map identifying one or more other origins that are allowed to access the hosted resources without a pre-flight request. A browser at a client device may download the CORS preauthorization map made available by a first origin, and web content from a second origin may be accessed via the browser. When the second origin requests to access a resource at the first origin, the browser can use the CORS preauthorization map to determine whether or not the second origin is identified as one of the other origins that is allowed to access the resource at the first origin. If the CORS preauthorization map indicates the second origin is allowed to access the resource, the browser may enable the web content (e.g., a script) from the second origin to access the resource. The browser can use the CORS preauthorization map for the first origin to check for resource requests made by multiple other origins. Thus, using the CORS preauthorization map, the browser can avoid sending a pre-flight request each time another origin requests to access resources at the first origin.

FIG. 1 shows an example implementation of a system with which some aspects of the present disclosure may be implemented. As shown, a client device 202, operated by a user 102, may execute a browser 104 (e.g., a web browser installed at the client device 202, an embedded browser of an application, a virtual browser delivered by a remote browser service, etc.) to access web content such as websites, web applications, videos, images, etc. The client device 202, via the browser 104, may be in communication with a first origin 115, which may be deployed at a first computing system. The first origin 115 may be a domain hosting one or more resources (e.g., websites, images, videos, scripts, stylesheets, HTML elements, APIs, etc.) accessible via a browser. The client device 202, via the browser 104, may also be in communication with a second origin 116, which may be deployed at a second computing system. The second origin 116 may be separate from the first origin 115, and may be a domain hosting one or more other resources (e.g., websites, images, videos, scripts, stylesheets, HTML elements, APIs, etc.) accessible via a browser. The client device 202 may be in communication with the first origin/computing system 115 and the second origin/computing system 116 via one or more networks 206 (not shown in FIG. 1). Each of the first origin/computing system 115 and the second origin/computing system 116 may be implemented by one or more servers 204. Examples of components that may be used to implement the client device 202, the network(s) 206, and the server(s) 204, as well as examples of computing environments in which such components may be deployed, are described below in connection with FIGS. 2-4.

In some implementations, the browser 104 may be a web browser installed at the client device 202. In other implementations, the browser 104 may be an embedded browser of a resource access application 522 of a multi-resource access system 500 described below (in Section E) in connection with FIGS. 5A-D. In still other implementations, the browser 104 may be a virtual browser delivered to the client device 202 by a remote browser service, as also described below (in Section E) in connection with FIGS. 5A-D.

FIG. 1 further shows an example routine 120 that may be performed by the client device 202 to implement some aspects of the present disclosure. In some implementations, the routine 120 may be performed by the browser 104. The routine 120 may, for example, be implemented as part of a browser plug-in, a browser add-in, a browser extension, a script or the like.

At a step 122 of the routine 120, the browser 104 may receive, from the first origin 115, preauthorization data 106 identifying a plurality of other origins that are permitted to send instructions to the browser 104 that cause the browser 104 to access one or more resources at the first origin 115. The preauthorization data 106 may identify the other origins using one or more of a domain (e.g., "www.example.com"), a protocol (e.g., "http://," "https://," etc.), or a port identifier (e.g., ":8080"). The client device 202 may store the preauthorization data 106 in a memory (e.g., a cache). In some implementations, the preauthorization data 106 may be stored in a cache of the browser 104. In some implementations, the preauthorization data 106 may be referred to as CORS preauthorization data or CORS preauthorization map.

At a step 124 of the routine 120, the browser 104 may determine that data (e.g., web content including a script) received from the second origin 116 includes a first instruction 108 to access a first resource (e.g., a resource 110) at the first origin 115. In some examples, the second origin 116 may provide (e.g., host) a website or other web content that is being accessed by the user 102 at the client device 202 via the browser 104. The website may embed/include content (e.g., images, videos, stylesheets, scripts, HTML elements, websites, APIs, etc.) hosted by the first origin 115, which is different than the second origin 116. The HTML code used to render the website may include the first instruction 108 (e.g., within a script) to access the first resource (e.g., the resource 110) from the first origin 115. To render the content hosted by the first origin 115, the second origin 116 may need to access to the first resource (e.g., the resource 110) at the first origin 115. In some implementations, in response to receiving the first instruction 108, the browser 104 may perform the next step (i.e., step 126) of the routine 120.

At the step 126 of the routine 120, the browser 104 may determine that the second origin 116 is included among the plurality of other origins identified by the preauthorization data 106. As described above, the other origins may be identified using one or more of a domain, a protocol, or a port identifier. The browser 104 may determine that the domain, the protocol, and/or the port identifier of the second origin 116 matches corresponding information included in the preauthorization data 106, and thus determine that the second origin 116 is included among the plurality of other origins that is allowed to access resources at the first origin 115.

At a step 128 of the routine 120, the browser 104 may access, based at least in part on the second origin 116 being included among the plurality of other origins, the first resource (e.g., the resource 110) at the first origin 115 based on the first instruction 108. In some examples, the content corresponding to the first resource (e.g., the resource 110) may be rendered via the website (hosted by the second origin 116) being accessed by the user 102 using the browser 104.

In this manner, the browser 104 may use preauthorization data, provided by a first origin and identifying which other origins are allowed to access resources at the first origin, to evaluate resource access requests from one or more other origins.

The preauthorization data 106 may identify multiple other origins, and may be used by the browser 104 to evaluate resource access requests, from multiple different origins, for the first origin 115. In other words, the client device 202 need not download separate data or send individual preflight access requests for each different origin that wants to access resources at the first origin 115. By appropriately configuring the preauthorization data 106, the first origin 115 can identify multiple other origins that are allowed to access resources at the first origin 115.

Additional details and example implementations of embodiments of the present disclosure are set forth below in Section F, following a description of example systems and network environments in which such embodiments may be deployed.

B. Network Environment

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
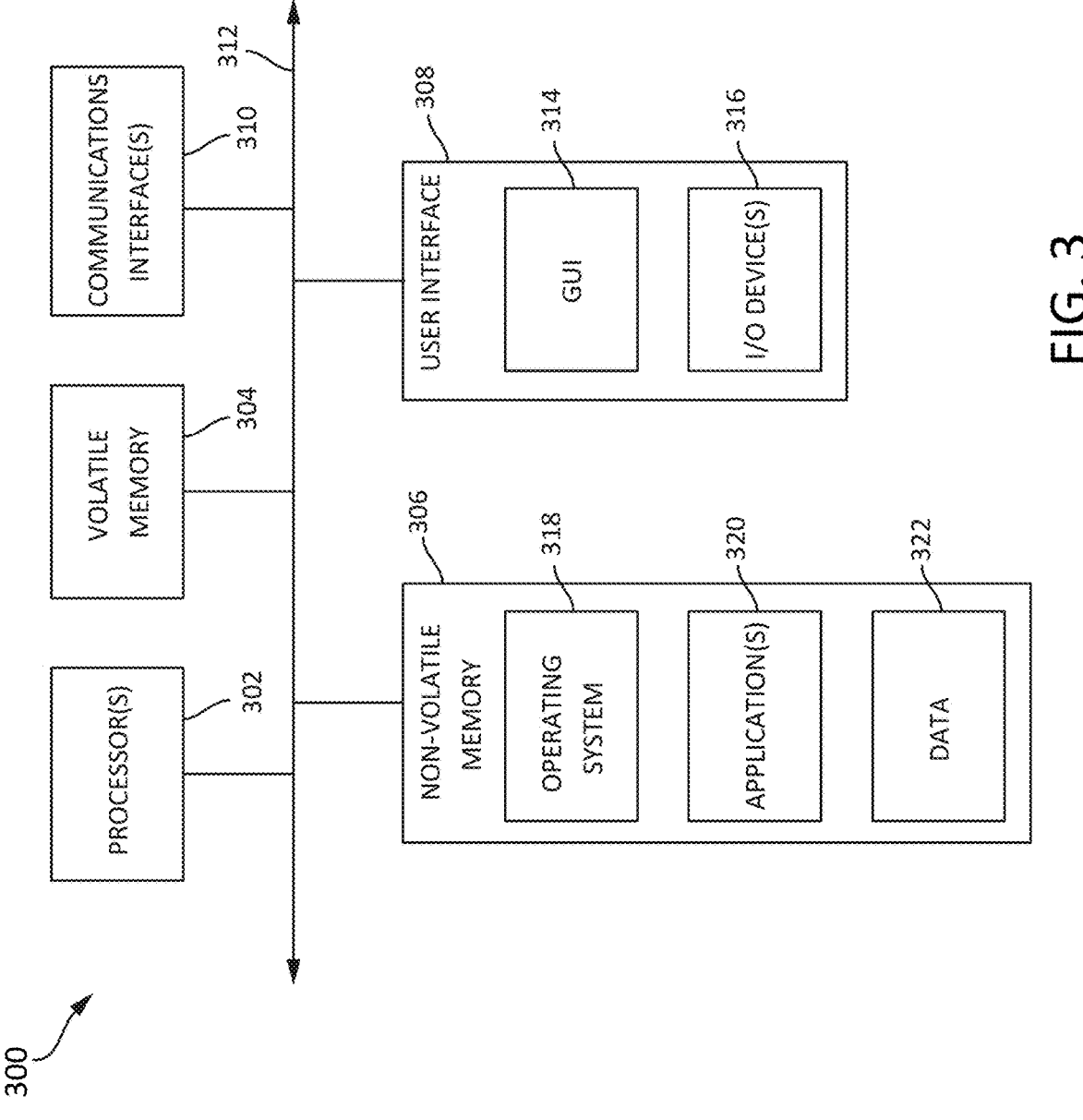
FIG. 3 is a block diagram of a computing system that may be used to implement one or more of the components of the computing environment shown in FIG. 2 in accordance with some embodiments.
Figure 4:
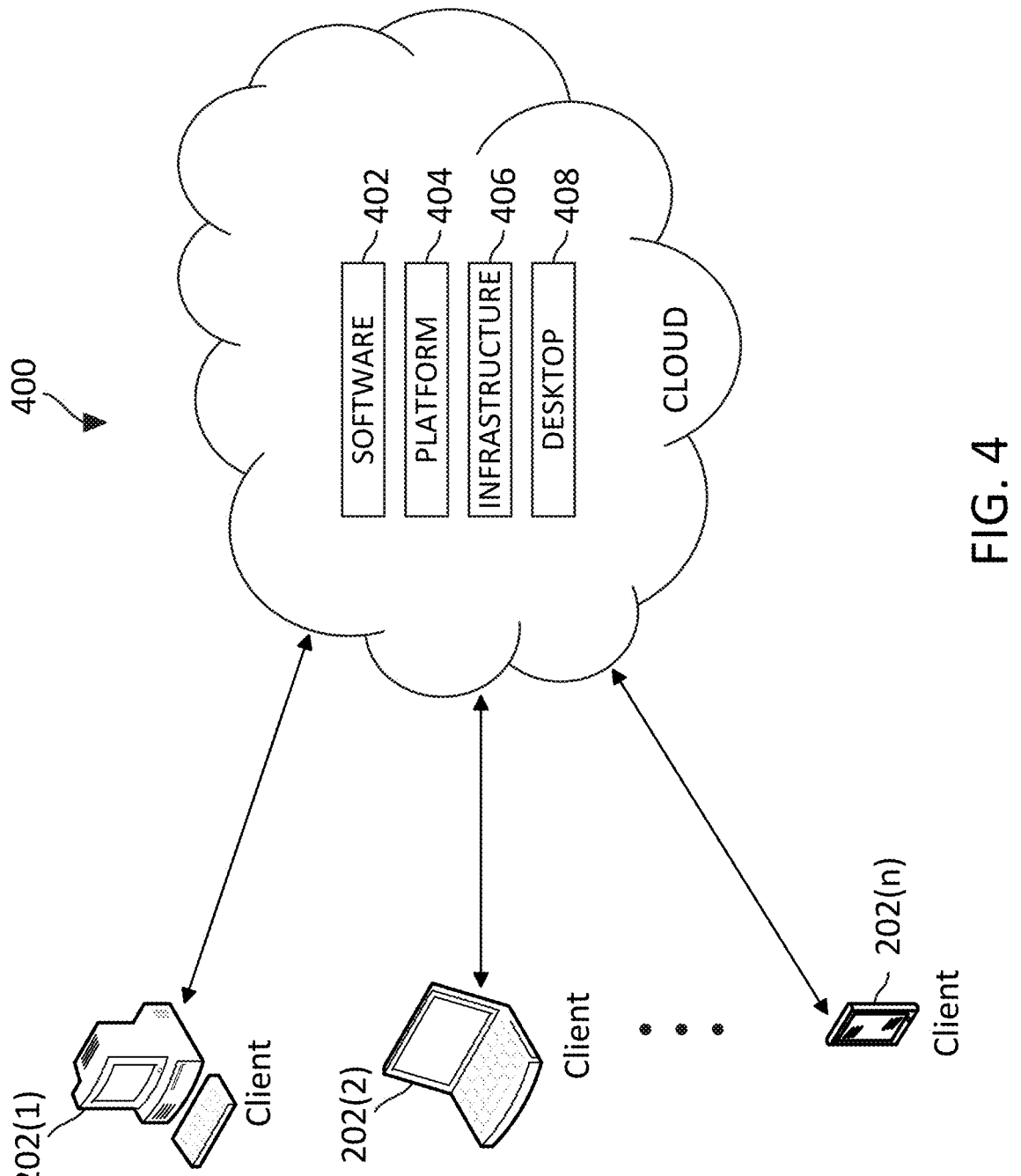
FIG. 4 is a schematic block diagram of a cloud computing environment in which various aspects of the disclosure may be implemented.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

Figure 5A:
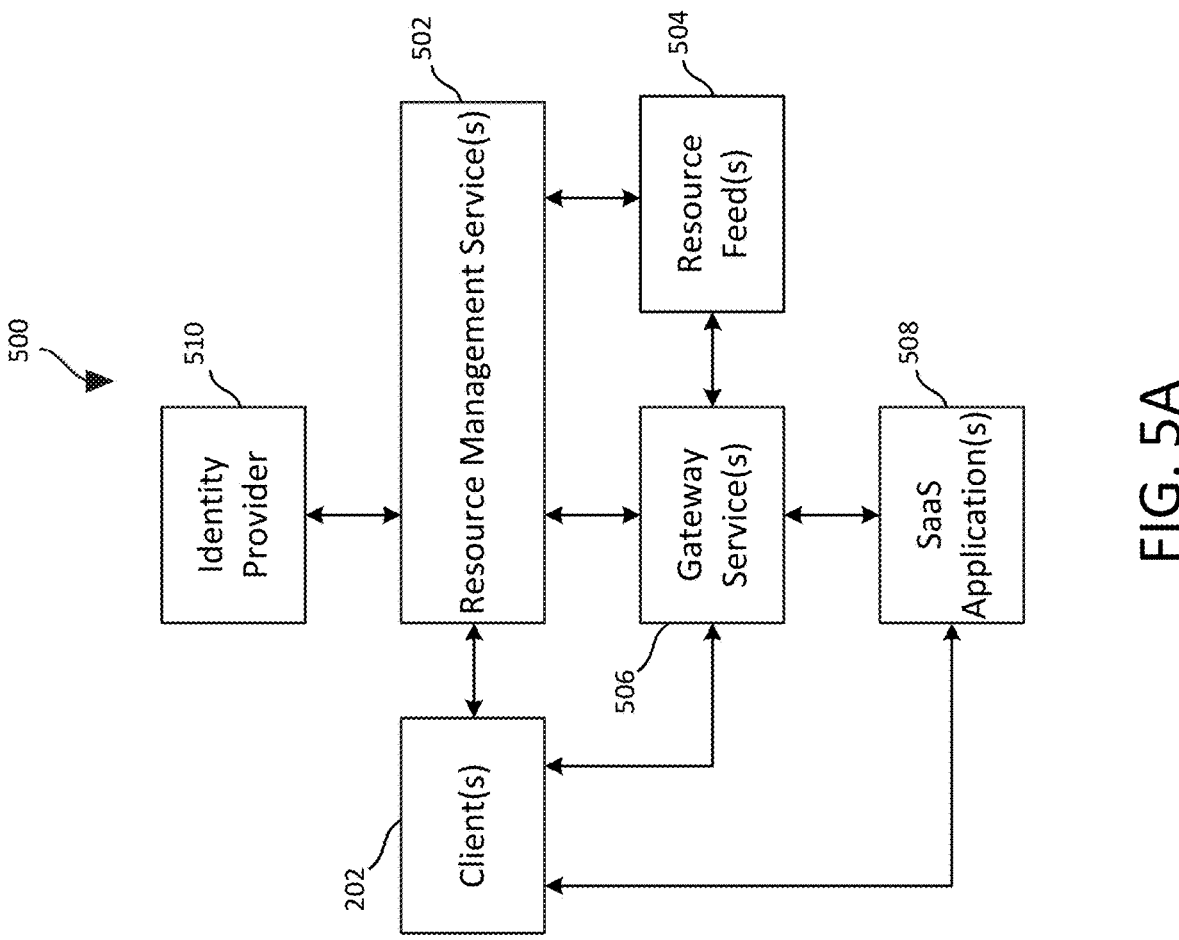
FIG. 5B is a block diagram showing an example implementation of the system shown in FIG. 5A in which various resource management services as well as a gateway service are located within a cloud computing environment.
FIG. 5C is a block diagram similar to that shown in FIG. 5B but in which the available resources are represented by a single box labeled "systems of record," and further in which several different services are included among the resource management services.
FIG. 5D shows how a display screen may appear when an intelligent activity feed feature of a multi-resource management system, such as that shown in FIG. 5C, is employed.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
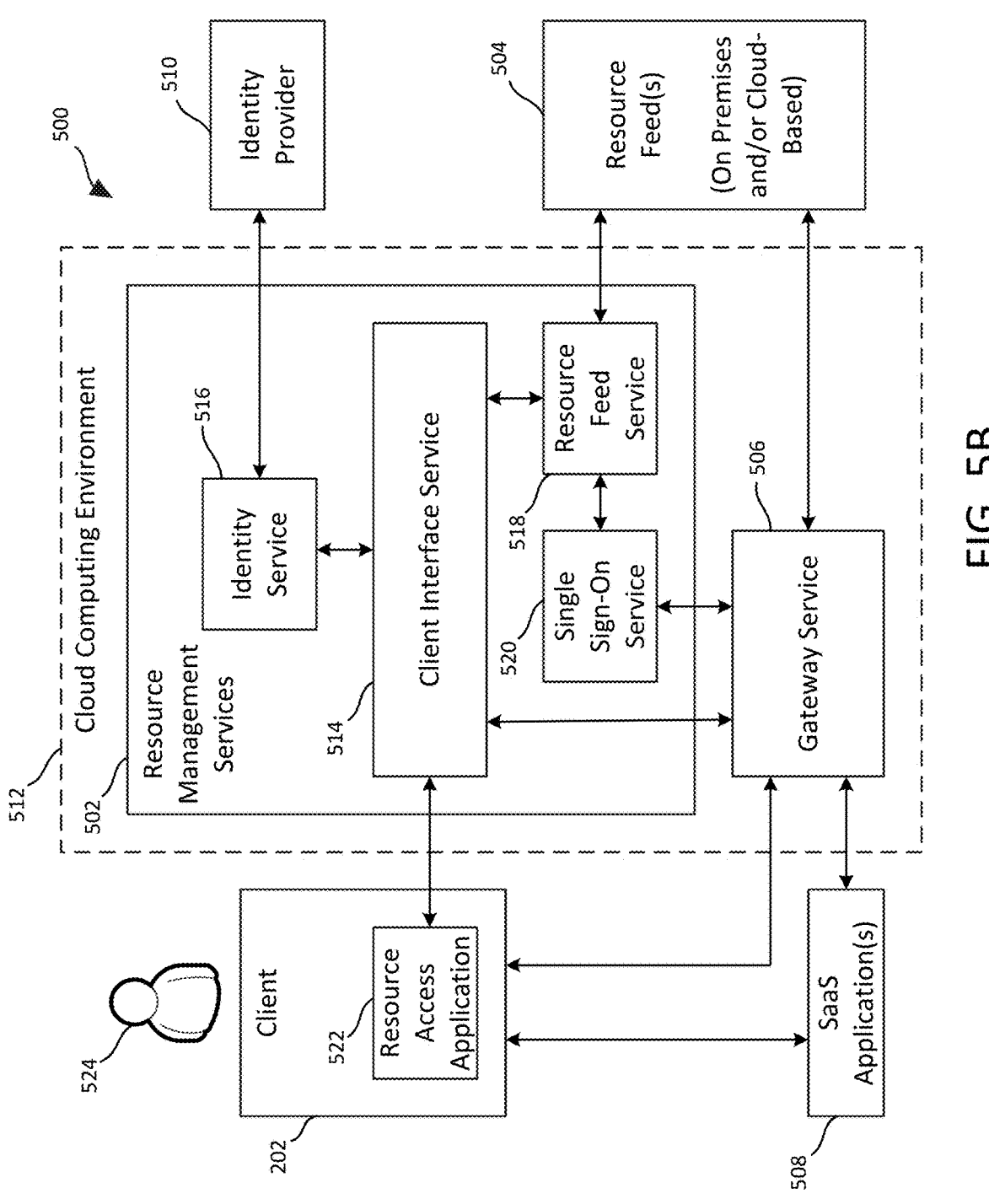

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-inone interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile), one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
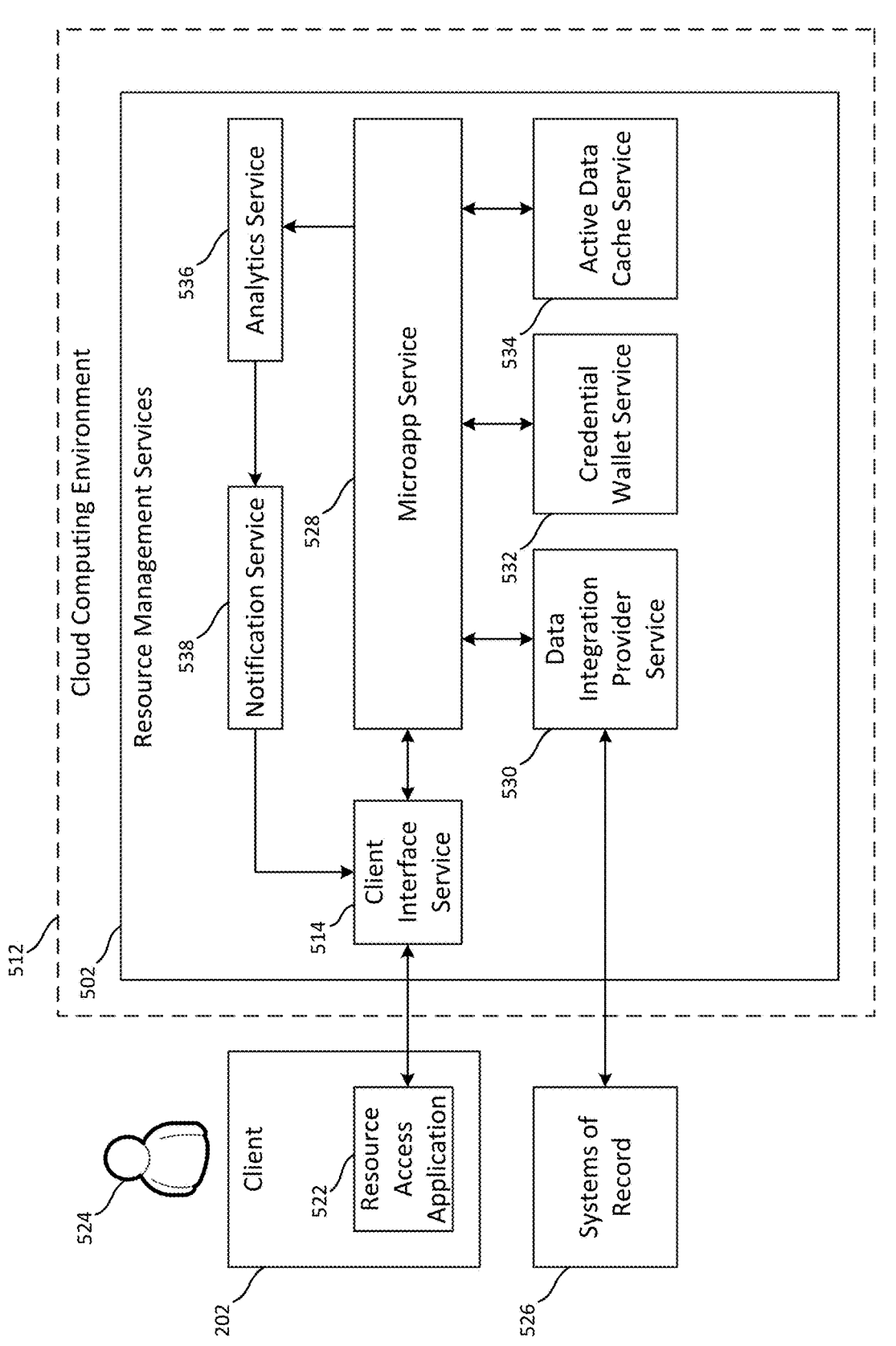

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream or otherwise provide the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
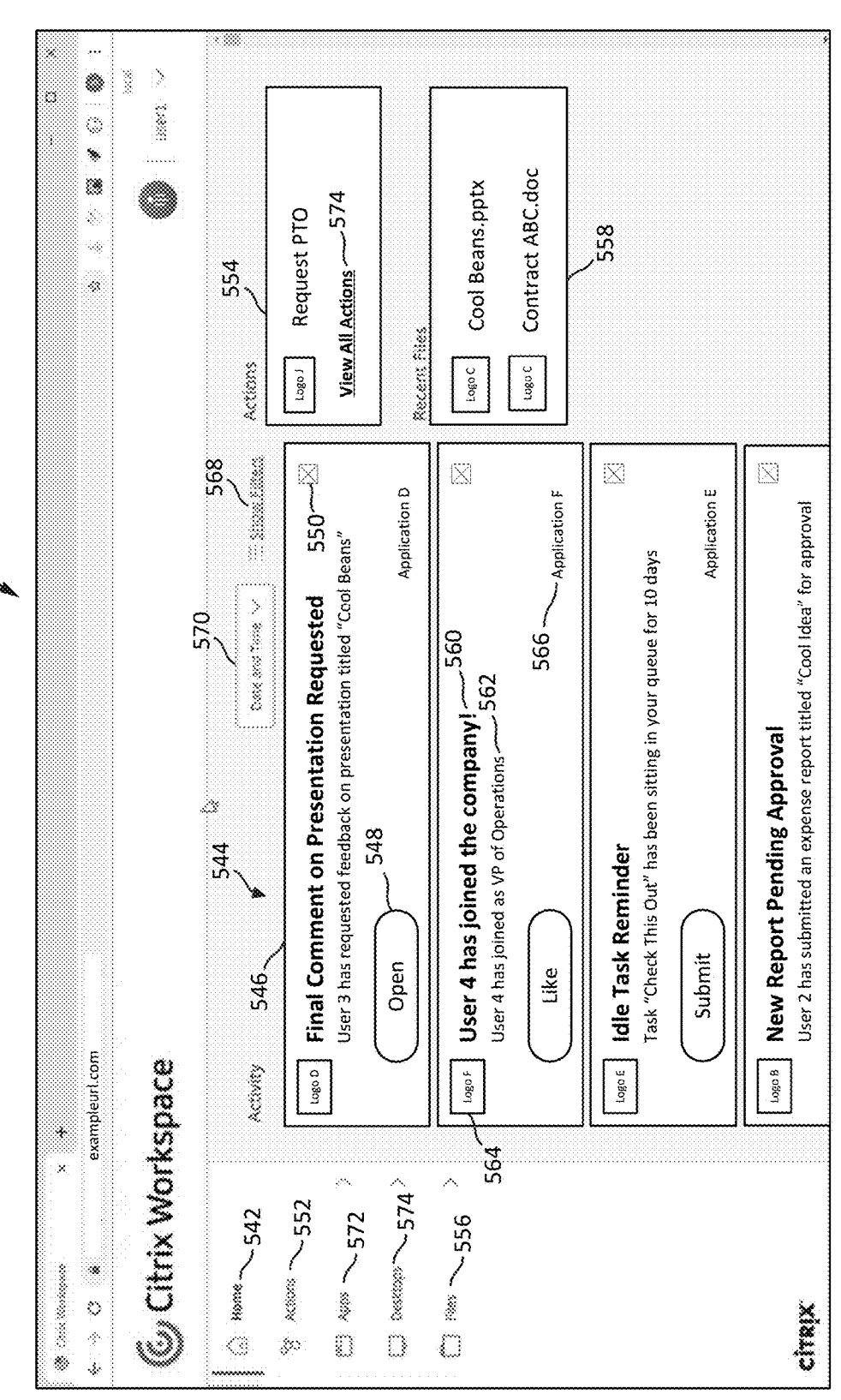

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g. using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp.

In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of available microapp actions. In some implementations, the various microapp actions available to the user 524 logged onto the multi-resource access system 500 may be enumerated to the resource access application 522, e.g., when the user 524 initially accesses the system 500, and the list 554 may include a subset of those available microapp actions. The available microapp actions may, for example, be organized alphabetically based on the names assigned to the actions, and the list 554 may simply include the first several (e.g., the first four) microapp actions in the alphabetical order. In other implementations, the list 554 may alternatively include a subset of the available microapp actions that were most recently or most commonly accessed by the user 524, or that are preassigned by a system administrator or based on some other criteria. The user 524 may also access a complete set of available microapp actions, in a similar manner as the "action" user interface element 552, by clicking on the "view all actions" user interface element 574.

As shown, additional resources may also be accessed through the screen 540 by clicking on or otherwise selecting one or more other user interface elements that may be presented on the screen. For example, in some embodiments, the user may also access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of the System Introduced in Section A As described above in Section A (with reference to FIG. 1), the present disclosure relates to a system that can use preauthorization data 106 (which may be alternatively referred to as a "CORS preauthorization map" or "CORS preauthorization data") provided by a first origin 115 to identify one or more other origins (e.g., the second origin 116) that are allowed to access resources (e.g., the resource 110) of the first origin 115, and thereby evaluate cross-origin resource requests and allow access based on the preauthorization data 106.

Figure 6:
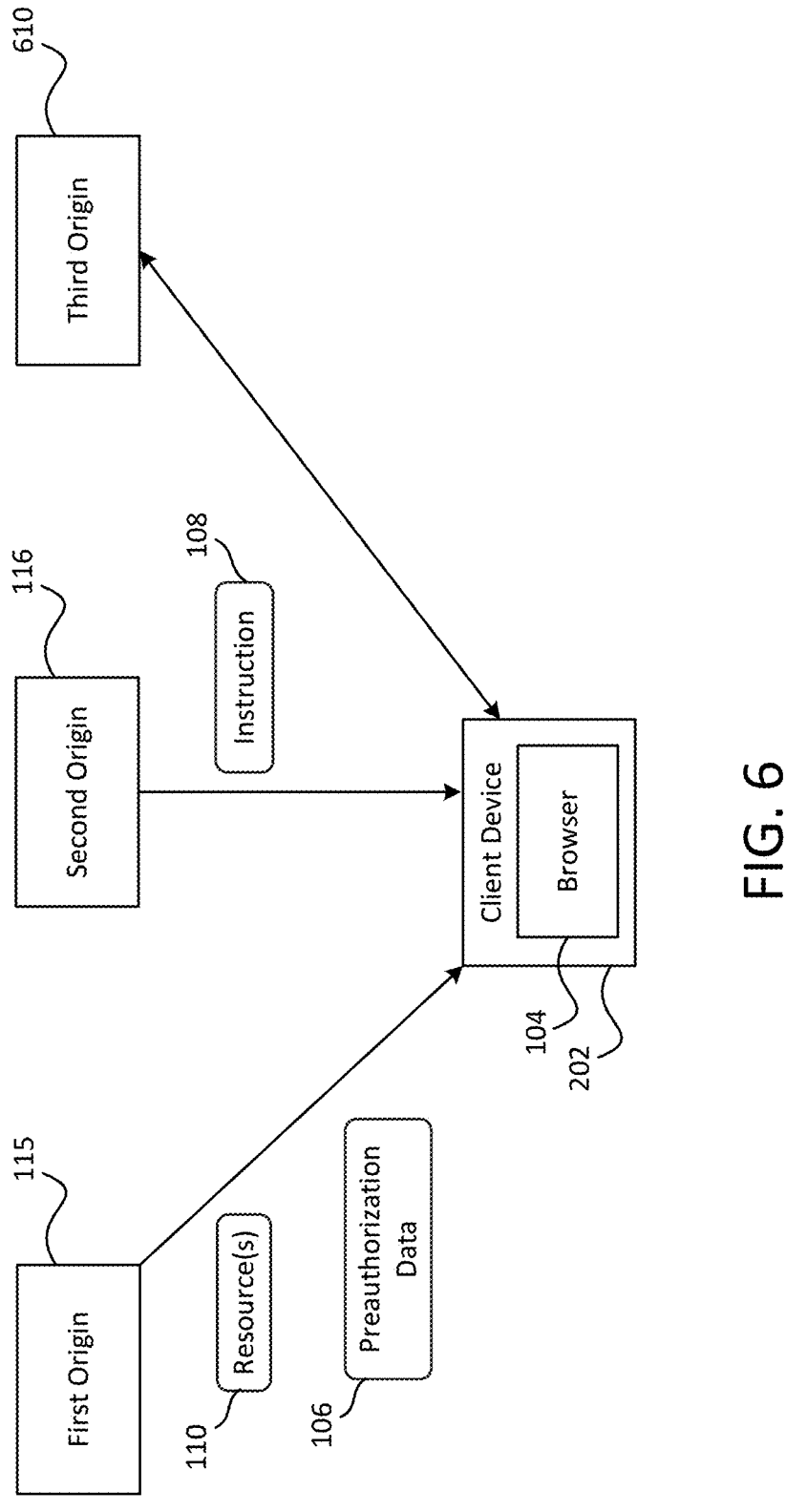
FIG. 6 is a diagram illustrating an example implementation of the system shown in FIG. 1.

FIG. 6 is a diagram illustrating an example configuration of a system that may be used to implement certain of the functionalities described herein. As shown in FIG. 6, the client device 202 may execute the browser 104 to access web content hosted at one or more origins (e.g., the first origin 115, the second origin 116 and a third origin 610). In some implementations, the browser 104 may be a browser installed at the client device 202 (e.g., Internet Explorer, Google Chrome, Safari, Mozilla Firefox, etc.). In other implementations, the browser 104 may be an embedded browser provided by the resource access application 522 of the multi-resource access system 500 described above in Section E. In still other implementations, the browser 104 may be a virtual browser delivered to the client device 202 by a remote browser service, as also described above in Section E.

Using the browser 104, the client device 202 may access (e.g., display, present, etc.) resources, such as websites, images, videos, stylesheets, scripts, APIs, HTML elements and other content, made available by one or more origins (e.g., domains). The origins may be implemented using one or more servers 204 (described above).

In the example implementation shown in FIG. 6, the first origin 115 may make available the preauthorization data 106 identifying one or more other origins (i.e., origins other than the first origin 115) that are allowed to access one or more resources 110 hosted by the first origin 115. The second origin 116 may provide web content that needs to access the resource(s) 110 hosted by the first origin 115, and may thus send the instruction 108 to the browser 104 (e.g., within a script of the web content) to request access to the resource(s) 110.

In some implementations, the client device 202 may additionally be in communication, using the browser 104, with a third origin 610. In some cases, the third origin 610 may provide preauthorization data identifying one or more other origins that are allowed to access one or more resources hosted by the third origin 610. In some cases, the third origin 610 may additionally or alternatively provide an instruction (not illustrated) to the browser 104 to request access to a resource (e.g., the resource 110) hosted by another origin (e.g., the first origin 115). The presence of the third origin 610 in FIG. 6 thus illustrates that the browser 104 may receive preauthorization data from multiple different origins, and that the browser 104 may receive cross-origin resource requests from multiple different origins.

The preauthorization data 106 may, for example, include an allow-list (or approve-list) of origins allowed to access one or more resources without a pre-flight access request. In some implementations, the preauthorization data 106 can be downloaded from the first origin 115 using a known URL made available by the first origin 115. For example, the first origin 115 hosting the domain "www.example-resource-provider.com" may make the preauthorization data 106 available at the URL "https://www.example-resource-provider.com/cors-preauthorization."

The preauthorization data 106 may identify the other origins on the allow-list using one or more of a domain, a protocol, a port identifier, or an entire URL. In some implementations, the preauthorization data 106 may be in text format. In other implementations, the preauthorization data 106 may be in another format, such as extensible markup language (XML), JavaScript object notation (JSON), or other format. Example content of the preauthorization data 106 may be:

https://www.example-resource-provider.com    https://www.example1.com,
    https://www.example2.com,    http://www.example.api.com/index In the above example, the first origin 115, providing the preauthorization data 106, may be "https://www.example-resource-provider.com" and the allow-list of origins may include (1) "https://www.example1.com," (2) "https://www.example2.com," and (3) "http://www.example.api.com." The first origin 115, providing the preauthorization data 106, and the allow-list of origins may be separated, for example, using a tab. In other implementations, another type of delimiter (e.g., a semicolon, a colon, or another character) may be used to separate the first origin 115 and the allow-list of origins.

In some implementations, for security reasons, the preauthorization data 106 from the first origin 115 can enable access only to resources hosted by the first origin 115 using one or more URLs that matches the first origin 115. For example, the above example preauthorization data 106 may include only resource URL(s) with the hostname "www.example-resource-provider.com."

The example preauthorization data 106 provided above includes one origin ("www.example-resource-provider.com") from which resources can be accessed. However, the preauthorization data 106 may instead include separate entries identifying sub-resources of the origins and specifying an allow-list for the sub-resources. In some implementations, when the preauthorization data 106 includes a single entry for an origin, the allow-list of origins may be applied to any sub-resources hosted by the same origin. For example, the URL "www.example-resource-provider.com" may be an origin and "www.example-resource-provider.com/docs" may host sub-resources. In some implementations, the preauthorization data 106 may identify different allow-lists for the different sub-resources. In some implementations, more specific entries may override generic entries. That is, an allow-list for a sub-resource, if provided, may be used to evaluate cross-origin resource requests instead of an allow-list for an origin. Below is an example of preauthorization data 106 provided by an origin "example-resource-provider" and including allow-lists for its sub-resources:

https://www.example-resource-provider.com    https://www.example1.com,
    https://www.example2.com,    http://www.example.api.com
    https://www.example-resource-provider.com/docs https://www.example1.com,
    https://www.example123.com,    http://www.example.api.com
    https://www.example-resource-provider.com/FAQs
    https://www.exampleABC.com, http://www.example.api.com/

The origins on the allow-list may be identified using a Uniform Resource Identifier (URI) such as a URL or a URN, a hostname and/or port number. In some implementations, a primary origin included in the allow-list may also enable its sub-origins to access the resource(s) 110. For example, if the allow-list includes the primary domain "example1.com," then its subdomains (e.g., "docs.example1.com") may also be allowed access to the resource(s) 110. In other implementations, any sub-origins allowed access to the resource(s) 110 may need to be identified separately in the preauthorization data 106.

In some implementations, more specific entries in the allow-list may override generic entries. If a protocol or a URL is used to identify the origin in the allow-list, then the other origin requesting access to resources may need to match the specified protocol or URL. For example, if the allow-list includes "https://www.example1.com," and the cross-origin resource request is received from "http://www.example1.com," then access to the resource(s) 110 may be denied because the protocol (https: and http:) do not match. As another example, if the allow-list includes "https://www.docs.example1.com," and the cross-origin resource request is received from "https://www.example1.com," then access to the resource(s) 110 may be denied because the domains/URLs do not match.

In some implementations, the preauthorization data 106 may identify one or more HTTP methods that are allowed to be used to access the resource(s) 110 at the first origin 115. HTTP defines methods to indicate the desired action to be performed on the identified resource. Examples of HTTP methods include: GET method (to retrieve a representation/copy of an indicated resource); HEAD method (to retrieve metadata for an indicated resource without a representation/copy of the indicated resource); POST method (requests an indicated resource to process data enclosed in the request), etc. When the preauthorization data 106 includes allowed HTTP methods, the browser 104 may enable access to the resource(s) 110 if the instruction 108, from the other origin, identifies one of the allowed HTTP methods. Below is an example of preauthorization data 106 from an origin "example-resource-provider" where a particular method is included for a sub-resource. Per the below example, the two specified origins "https://www.example1.com", and "https://www.example123.com" are allowed to access resources at "https://www.example-resource-provider.com/docs" using the specified POST method only, whereas the three specified origins "https://www.example1.com," "https://www.example2.com," and "http://www.example.api.com" are allowed to access resources at "https://www.example-resource-provider.com/docs" using any other methods than POST. The first line/rule may be referred to as a generic rule, which applies unless a more specific/overriding rule is included. The second line/rule may be referred to as an override rule for the generic rule since it is more specific (e.g., includes a specific method) than the generic rule.

Figure 7A:
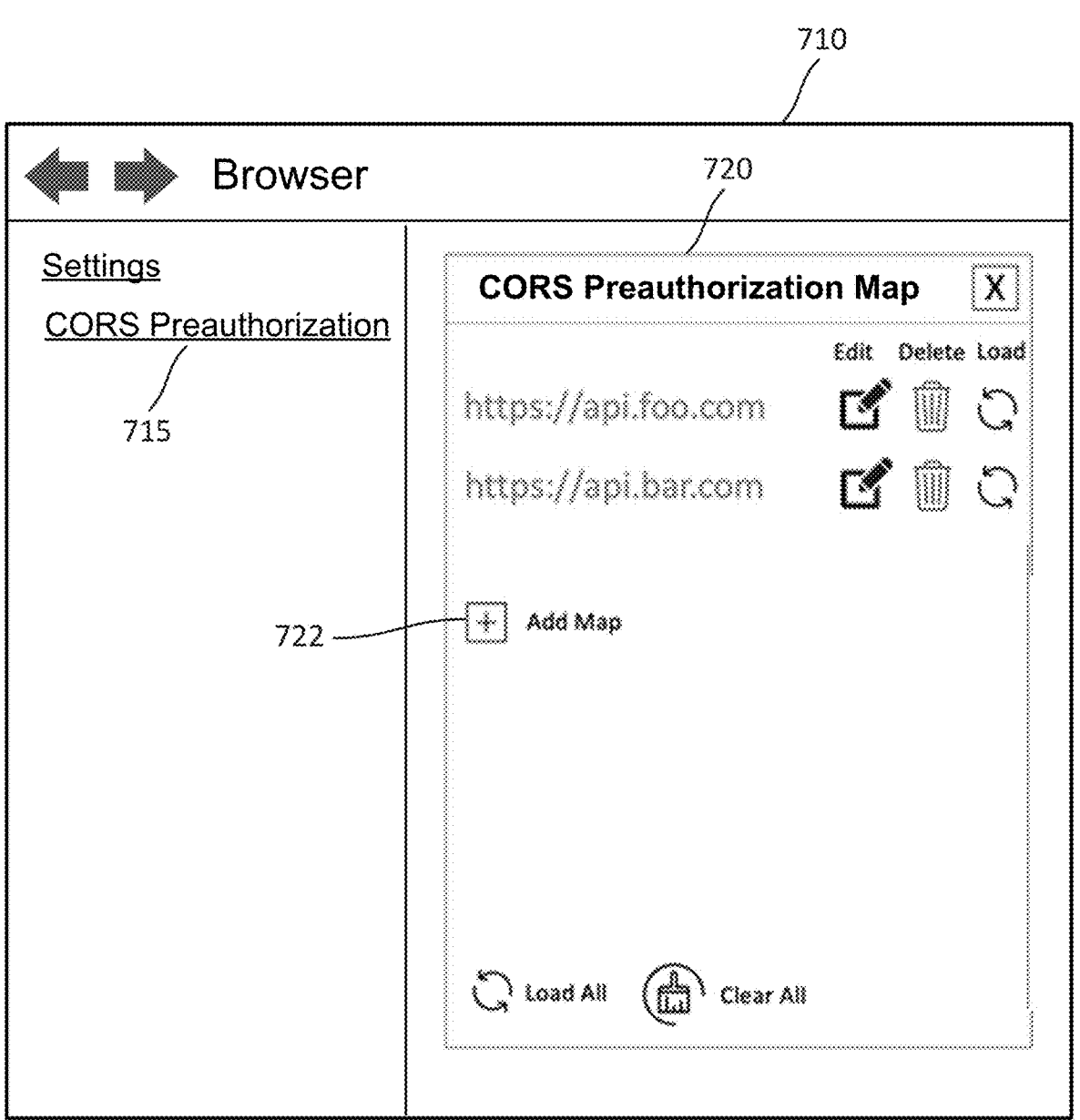
FIG. 7A illustrates an example user interface screen of a browser that may be used to download preauthorization data from an origin.
Figure 7B:
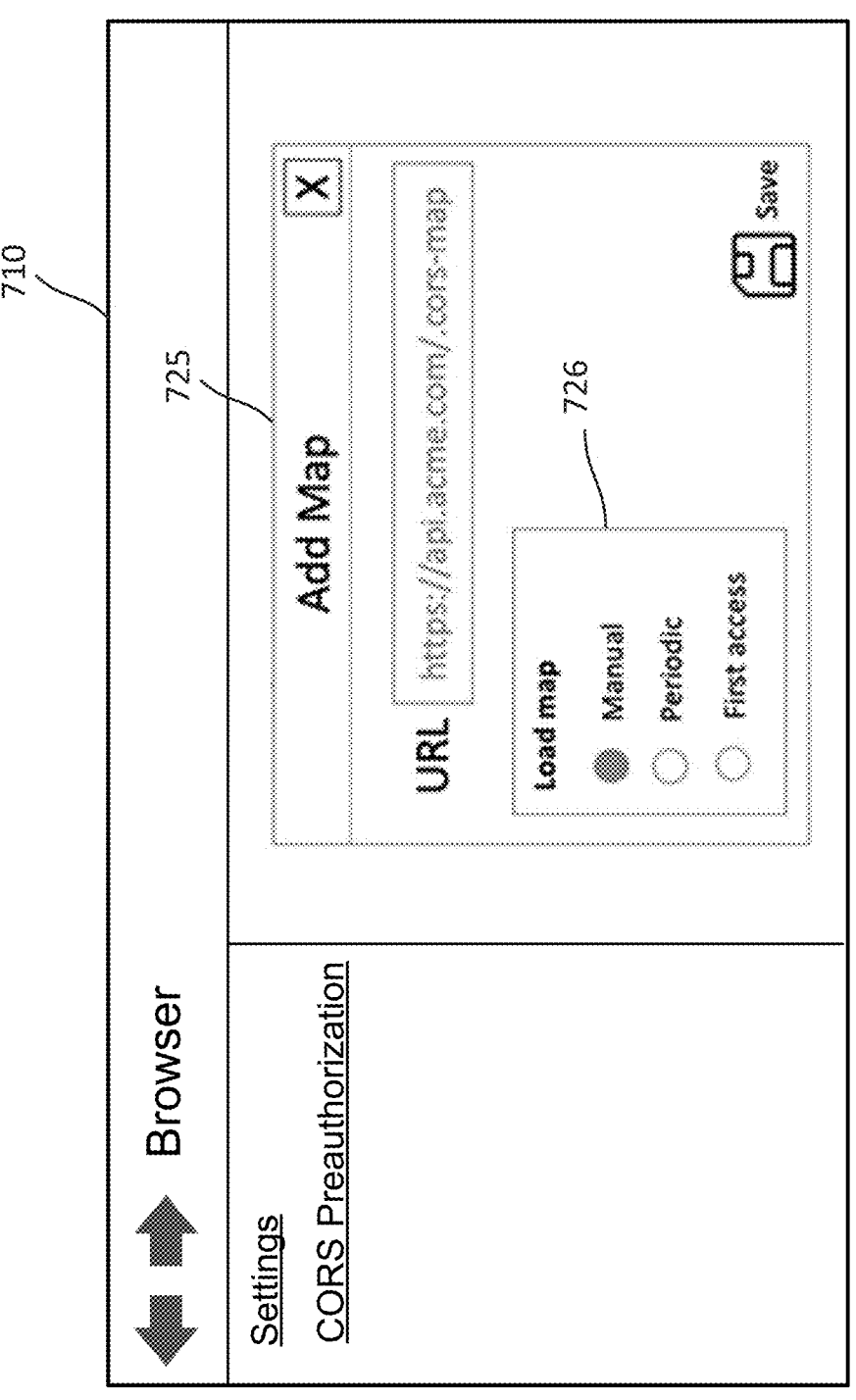
FIG. 7B illustrates another example user interface screen of a browser that may be used to download preauthorization data from an origin.

> https://www.example-resource-provider.com/docs https://www.example1.com,
> https://www.example2.com, http://www.example.api.com
> POST https://www.example-resource-provider.com/docs
> https://www.example1.com, https://www.example123.com FIGS. 7A-7B illustrate example user interface screens of the browser 104 that may be operated by the user 102 to indicate origins from which preauthorization 106 data is to be downloaded. FIG. 7A shows an example user interface screen 710 of the browser 104. In some implementations, the browser 104 may enable the user 102 to provide inputs, related to CORS preauthorization data, via a "settings" option and a further "CORS preauthorization" option. The user interface screen 710 may, for example, present a selectable user interface element 715, selection of which may cause presentation of a CORS Preauthorization Map (user interface element 720) as shown in FIG. 7A. As shown in the user interface element 720, one or more origins (from which preauthorization data 106 is to be downloaded) may be indicated. Such origins may be inputted by the user 102. The user interface element 720 may also enable the user 102 to edit, delete, or load CORS preauthorization data from the respective origins using icons shown in the user interface element 720.

As shown in FIG. 7A, the user interface element 720 may include a selectable user interface element 722, selection of which may enable the user 102 to add additional origins from which preauthorization data is to be downloaded. In some implementations, selection of the user interface element 722 may cause presentation of an additional user interface element. For example, the user interface screen 710 may present a user interface element 725 as shown in FIG. 7B. The user 102 may provide inputs, via the user interface element 725, indicative of an origin. As shown in FIG. 7B, the user 102 may input a URL, associated with an origin, that specifies a path from which the origin's CORS preauthorization map 106 can be downloaded.

Additionally, in some implementations, the browser 104 may enable the user 102 to indicate the circumstances in which the CORS preauthorization data 106 is to be downloaded. As shown in FIG. 7B, in some implementations, the user interface element 725 may present a box 726 including a set of radio buttons, each corresponding to a different option for downloading the CORS preauthorization data 106. As shown, one option may be a manual load, where the CORS preauthorization data 106 is downloaded from the origin when the browser 104 receives an input from the user 102 to do so. Another option may be a periodic load, where the CORS preauthorization data 106 is downloaded from the origin on a periodic basis (e.g., once a week, once a month, etc.), where the period may be indicated by the user 102, may depend on browser configurations, origin configurations, etc. Another option may be a first access load, where the CORS preauthorization data 106 is downloaded from the origin when the first request to access resource at the origin is received by the browser 104.

Figure 8:
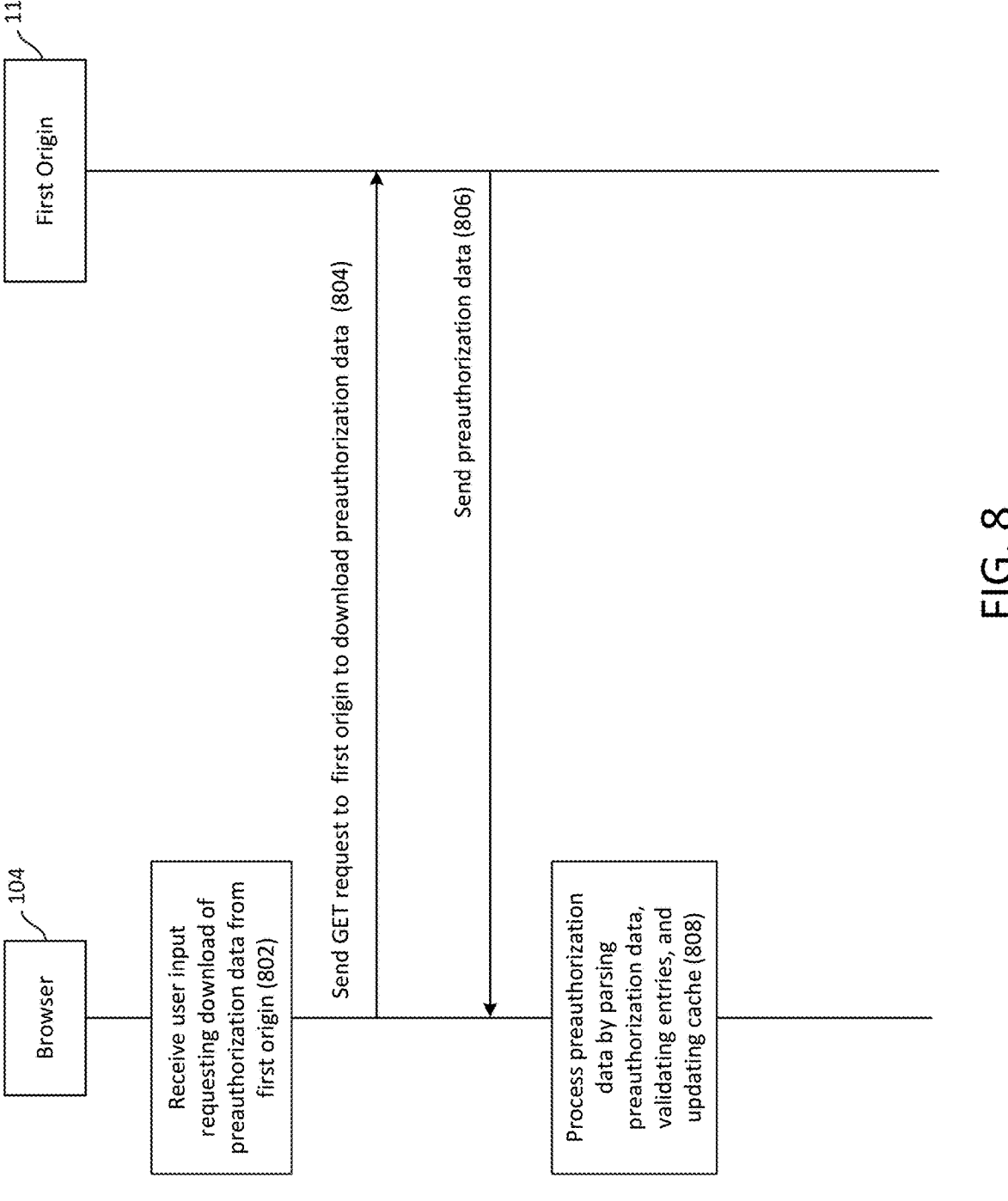
FIG. 8 is an example signal flow diagram for downloading preauthorization data based on a manual load request, according to an example implementation of the system shown in FIG. 6.
Figure 9:
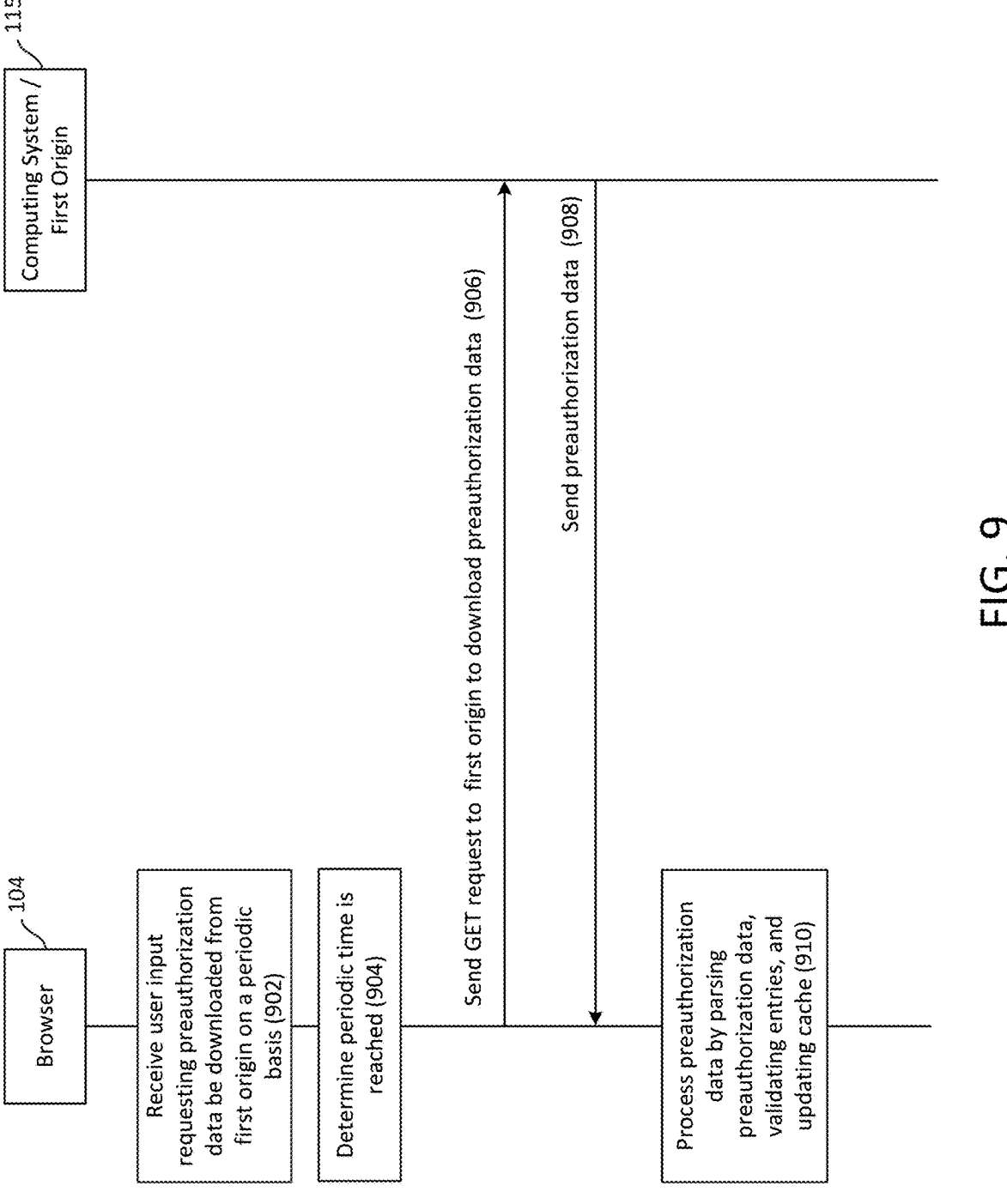
FIG. 9 is an example signal flow diagram for downloading preauthorization data based on a periodic load request, according to an example implementation of the system shown in FIG. 6.
Figure 10:
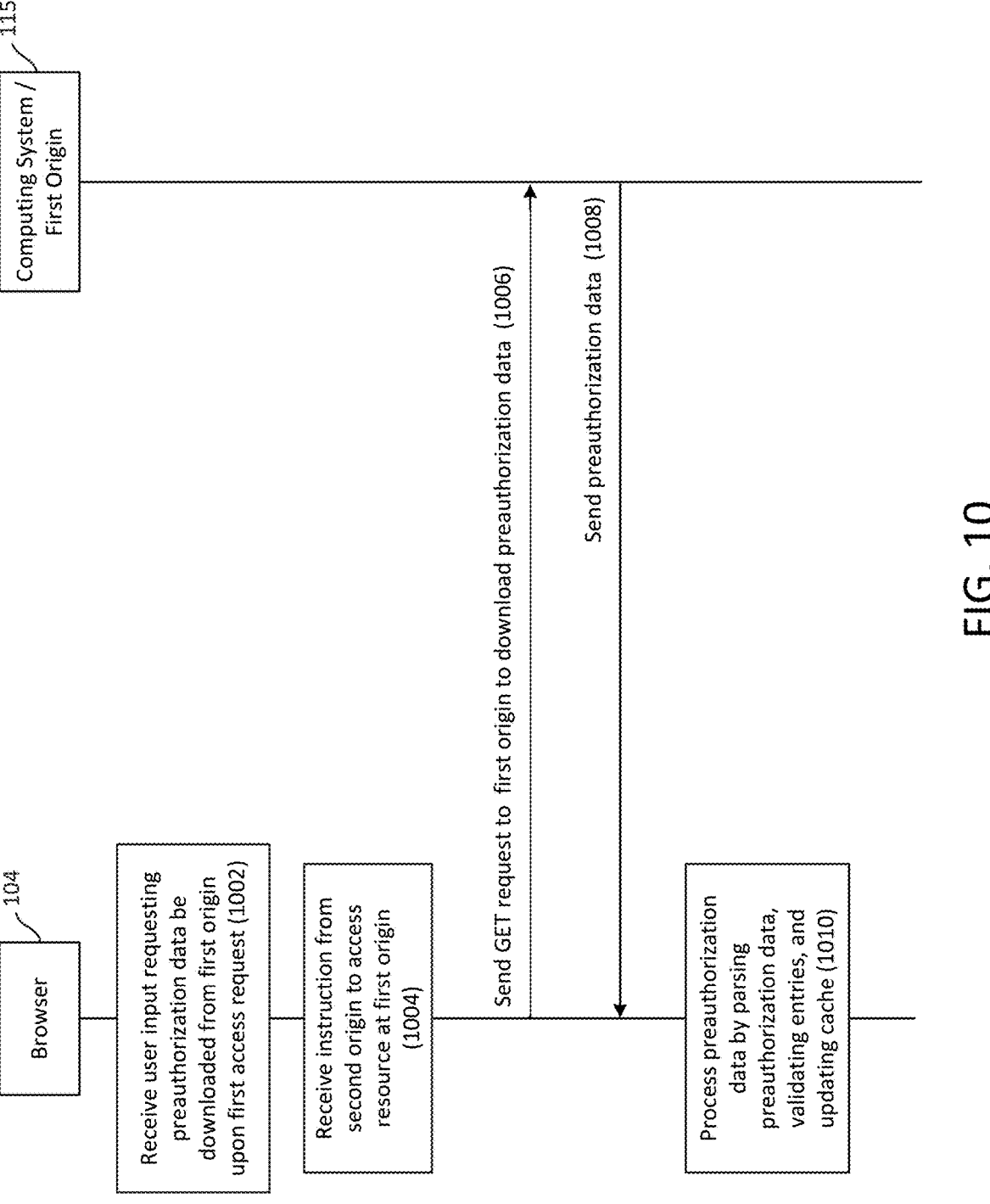
FIG. 10 is an example signal flow diagram for downloading preauthorization data based on a first access load request, according to an example implementation of the system shown in FIG. 6.

FIGS. 8-10 show example signal flow diagrams illustrating how preauthorization data 106 may be downloaded under the different load options shown in the box 726 of FIG. 7B. FIG. 8 illustrates downloading of preauthorization data 106 from the first origin 115 based on a manual load. At a step 802, the browser 104 may receive a user input requesting download of preauthorization data 106 from the first origin 115. For example, the user 102 may input the URL for the first origin 115 in the user interface element 725, may select the "manual" radio button in the box 726 (shown in FIG. 7B), and may save these inputs. As another example, the user 102 may select a "load" icon in the user interface element 720 (shown in FIG. 7A) and associated with a URL (or domain) of the first origin 115.

In response to receiving the user input, at a step 804, the browser 104 may send a GET request to the first origin 115 to download the preauthorization data 106. The browser 104 may send the GET request as a HTTP method request to the URL from which the preauthorization data 106 for the first origin 115 can be downloaded. In response to receiving the GET request, at a step 806, the first origin 115 may send the preauthorization data 106 to the browser 104.

At a step 808, the browser 104 may process the preauthorization data 106, such as by parsing the preauthorization data 106, validating the entries, and updating the cache. As described above, the preauthorization data 106 may identify multiple other origins (e.g., the second origin 116, the third origin 610, etc.) that are allowed to access resources 110. Additionally or alternatively, the preauthorization data 106 may identify an origin (e.g., the first origin 115) and sub-resources hosted by the origin that can be accessed. The browser 104 may parse the preauthorization data 106 to identify individual entries (which may be separated using delimiters) of allowed other origins and accessible resources. The browser 104 may also validate the identified entries. Such validation may involve determining that the origin and sub-resources (if any) identified in the preauthorization data 106 correspond to a domain name of the first origin 115. This may be done to ensure that the preauthorization data 106 allows access only to resource(s) 110 that are hosted at the first origin 115, and not to resources hosted at another origin by identifying a domain of another origin in the preauthorization data 106. Such validation may also involve determining that the other origins (in the allow-list) are identified appropriately, for example, using one or more of a URI scheme, hostname, and/or port number. The browser 104 may also update the cache (the browser 104 cache or the client device 202 cache) to store the entries identified from the preauthorization data 106.

FIG. 9 illustrates downloading of preauthorization data 106 from the first origin 115 on a periodic basis. At a step 902, the browser 104 may receive a user input requesting the preauthorization data 106 be downloaded from the first origin 115 on a periodic basis. For example, the user 102 may input the URL for the first origin 115 in the user interface element 725, may select the "periodic" radio button in the box 726 (shown in FIG. 7B), and may save these inputs. At a step 904, the browser 104 may determine that a periodic time has been reached. The periodic time (frequency at which preauthorization data is to be downloaded) may be provided by the user 102, or may be determined based on browser settings/configurations, first origin settings/configurations, or other system configurations. Based on the periodic time, the browser 104 may download/update the preauthorization data 106 on a weekly basis, a monthly basis, a bi-monthly basis, or other time period.

In response to the periodic time being reached, at a step 906, the browser 104 may send a GET request to the first origin 115 to download the preauthorization data 106 (in a similar manner as described above in relation to step 804 of FIG. 8). In response to receiving the GET request, at a step 908, the first origin 115 may send the preauthorization data 106 to the browser 104. At a step 910, the browser 104 may process the preauthorization data 106, such as by parsing the preauthorization data, validating the entries, and updating the cache (in a similar manner as described above in relation to step 808 of FIG. 8). At a later time, when the periodic time is reached again (e.g., a week, a month, etc. has elapsed since last download), the browser 104 may send another request (per the step 906) to the first origin 115 to download the preauthorization data 106.

FIG. 10 illustrates downloading of preauthorization data 106 from the first origin 115 upon first access. At a step 1002, the browser 104 may receive a user input requesting the preauthorization data 106 be downloaded from the first origin 115 upon a first access request. For example, the user 102 may input the URL for the first origin 115 in the user interface element 725, may select the "first access" radio button in the box 726 (shown in FIG. 7B), and may save these inputs.

At a step 1004, the browser 104 may receive the instruction 108 from the second origin 116 to access a resource at the first origin 115. The browser 104 may determine that the received request is the first request to access one or more resources at the first origin 115. Additionally or alternatively, the browser 104 may determine that preauthorization data for the first origin 115 is not available in a cache of the browser 104/the client device 202.

At a step 1006, the browser 104 may send a GET request to the first origin 115 to download the preauthorization data 106 (in a similar manner as described above in relation to step 804 of FIG. 8). In response to receiving the GET request, at a step 1008, the first origin 115 may send the preauthorization data 106 to the browser 104. At a step 1010, the browser 104 may process the preauthorization data 106, such as by parsing the preauthorization data, validating the entries, and updating the cache (in a similar manner as described above in relation to step 808 of FIG. 8).

In some implementations, the browser 104 may include a script (or other code) that automatically identifies origins (e.g., the first origin 115) from which preauthorization data is to be downloaded, rather than waiting for the user 102 to enter the first origin 115 (as shown in FIG. 7B). The script may identify such origins based on past pre-flight requests sent by the browser 104, which origins the pre-flight requests were sent to, and/or how frequently pre-flight requests were sent to a particular origin. The script may determine that a particular origin, for example the first origin 115, is frequently contacted using pre-flight requests, and thus, it may be more efficient (with respect to cross-origin resource requests) to download and store the preauthorization data 106 for the first origin 115.

Figure 11:
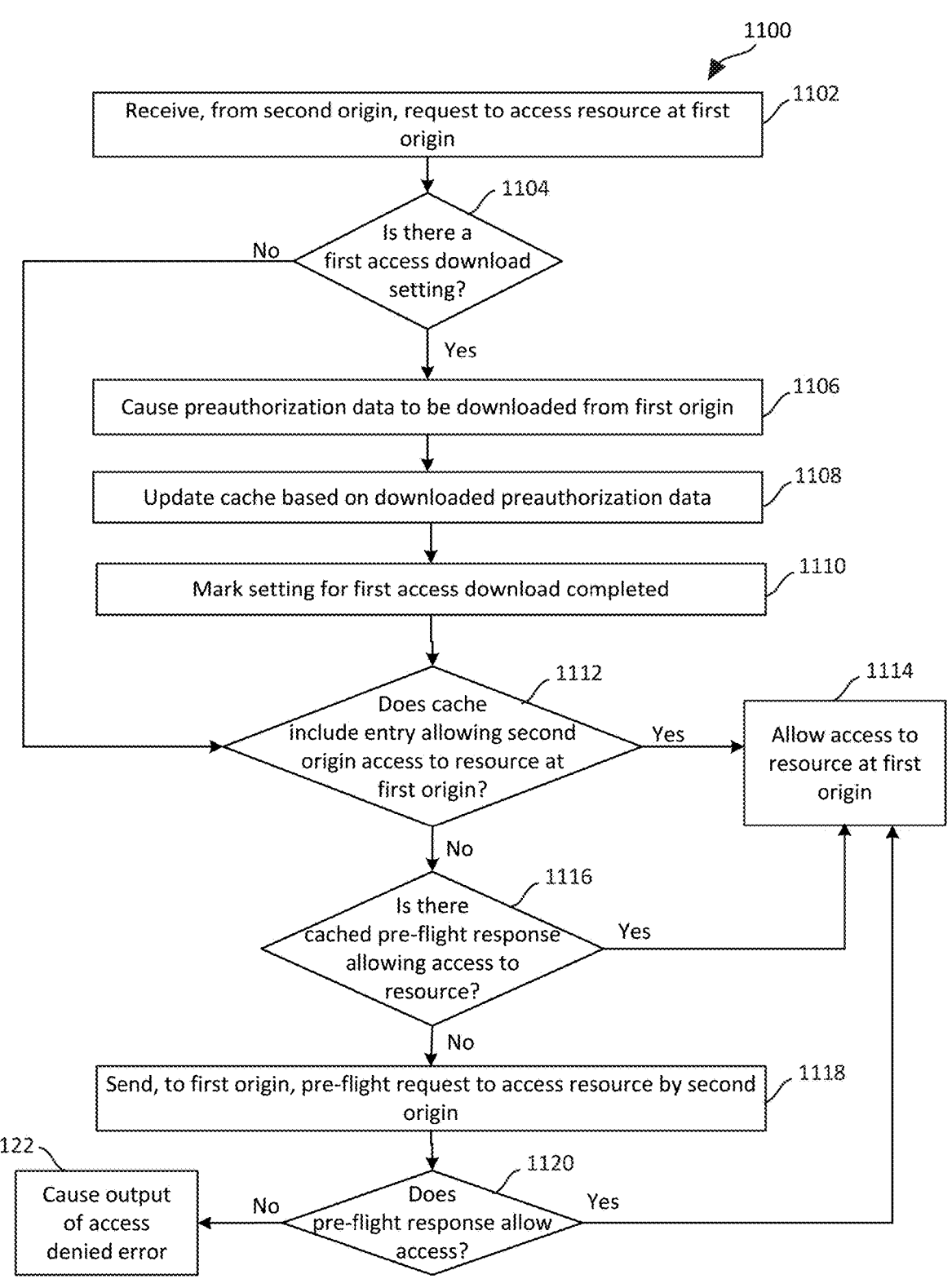
FIG. 11 is a flowchart of an example routine that may be performed by a browser to evaluate a cross-origin resource access request according to an example implementation of the system shown in FIG. 6.

FIG. 11 shows an example routine 1100 that may be performed by the browser 104 in response to receiving a cross-origin resource access request. At a step 1102 of the routine 1100, the browser 104 may receive, from the second origin 116, a request to access one or more resources 110 at the first origin 115. For example, the browser 104 may receive the instruction 108 from the second origin 116, where the instruction 108 may include a HTTP method and an indication of the first origin 115.

At a decision step 1104 of the routine 1100, the browser 104 may determine if there is a first access download setting indicated for the first origin 115. For example, the user 102 may indicate that preauthorization data 106 is to be downloaded upon a first access request (e.g., by selecting the "first access" radio button in the box 726 shown in FIG. 7B). Based on determining that preauthorization data for the first origin 115 is to be downloaded upon a first access request, at a step 1106 of the routine 1100, the browser 104 may cause the preauthorization data 106 to be downloaded from the first origin 115. At a step 1108, the browser 104 may update a cache (of the browser 104 or the client device 202) based on the downloaded preauthorization data 106. In some implementations, the browser 104 may process the preauthorization data 106 as described above in relation to step 808 of FIG. 8. At a step 1110 of the routine 1100, the browser 104 may mark a setting for a first access download completed. The first origin 115 may be associated with a first access setting, and based on storing the preauthorization data 106, the first access setting may be marked as completed. Then a decision step 1112 of the routine 1100 may be performed (as described below).

If there is no first access download setting for the first origin 115 (per the decision step 1104), then the routine 1100 may continue directly to the decision step 1112. At the decision step 1112, the browser 104 may determine if the cache includes an entry allowing the second origin 116 access to the resource(s) 110 at the first origin 115. The browser 104 may determine whether the second origin 116 (using one or more of a domain name, a protocol, a port, or an entire URL) is included among the allow-list of other origins for the requested resource identified in the preauthorization data 106. If the second origin 116 is allowed to access the resource(s) 110, then at a step 1114, the browser 104 may allow access to the resource(s) 110 at the first origin 115. Such access may be allowed by the browser 104 sending the actual request (e.g., a HTTP method request), which may be included in the instruction 108, to the first origin 115 to access the resource(s) 110.

If the second origin 116 is not allowed to access the resource(s) 110 (based on the analysis of the cache entries from the preauthorization data 106 at the decision step 1112), then at a decision step 1116, the browser 104 may determine if there is a cached pre-flight response allowing access to the resource(s) 110. In some implementations, the browser 104 may cache, for a temporary period of time, pre-flight responses received from the first origin 115 (or other origins hosting resources). The pre-flight response may identify the other origin and the resources, at the first origin, that the other origin is allowed to access. If the second origin 116 and the requested resource are identified in the cached pre-flight response, then at the step 1114, the browser 104 may allow access to the resource(s) 110 at the first origin 115.

If the second origin 116 and the requested resource is not identified in the cached pre-flight response, then at a step 1118 of the routine 1100, the browser 104 may send, to the first origin 115, a pre-flight request to access the resource(s) 110 by the second origin 116. In some implementations, the browser 104 may send the pre-flight access request to the first origin 115 to determine whether the second origin 116 can access resource(s) 110. The browser 104 may use a request header, known as the Access-Control-Request-Method header, when issuing the pre-flight request, to let the first origin 115 know which HTTP method will be used when the actual cross-origin resource access request is made.

In response to the pre-flight request, the browser 104 may receive a response from the first origin 115. At a decision step 1120 of the routine 1100, the browser 104 may determine if the pre-flight response allows the requested access. The pre-flight response may include an indication of "approved" (or other similar indication) or "denied" (or other similar indication). If the pre-flight response allows the requested access, then at the step 1114, the browser 104 may allow access to the resource(s) 110 at the first origin 115. In some implementations, the browser 104 may cache the pre-flight response for a limited time period, so that if, at a later time, the second origin 116 requests access to the resource(s) 110 at the first origin 115 during the limited time period, then the browser 104 may allow the access (per the step 1114).

If the pre-flight response denies the requested access, then at a step 1122 of the routine 1100, the browser 104 may cause output of an access denied error. Such error may be presented via a user interface screen of the browser 104 being used to access web content hosted by the second origin 116.

Thus, the present disclosure describes techniques for a secure way to avoid sending pre-flight requests when CORS preauthorization data is available. If CORS preauthorization data is not available for an origin, then the browser may continue with the pre-flight request. This makes the techniques of the present disclosure compatible with the existing CORS mechanism.

In some implementations, the user 102 may choose, at any time, to delete the CORS preauthorization data. Doing so will make the browser send pre-flight requests for cross-origin resource access.

The techniques described herein enable avoiding pre-flight requests for trusted cross-origins. However, the techniques need not subvert any access control policies, based on access tokens or other security measures, that may be implemented by an origin. The access checks required on a resource server for an API access, for example, may still be performed before the request is actually executed.

In an example use case, an API gateway vendor may implement the techniques described herein, and may provide CORS preauthorization data as a configurable policy setting. This may allow implementation of CORS preauthorization data without having to make changes in the API implementations.

G. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves receiving, by a browser and from a first origin, preauthorization data identifying a plurality of other origins that are permitted to send instructions to the browser that cause the browser to access one or more resources at the first origin, determining, by the browser, that data received from a second origin includes a first instruction to access a first resource at the first origin, determining, by the browser, that the second origin is included among the plurality of other origins identified by the preauthorization data, and accessing, by the browser and based at least in part on the second origin being included among the plurality of other origins, the first resource at the first origin based on the first instruction.

(M2) A method may be performed as described in paragraph (M1), and may further involve in response to receiving the data from the second origin, determining that the preauthorization data for the first origin is unavailable at the browser, causing the browser to download of the preauthorization data from the first origin, and storing the preauthorization data in a memory of a computing device on which the browser is being accessed.

(M3) A method may be performed as described in paragraph (M1) or paragraph (M2), and may further involve receiving, by the browser, additional data from a third origin, the additional data including a second instruction to access a second resource at the first origin, determining, by the browser, that the third origin is unrepresented in the plurality of other origins identified in the preauthorization data, in response to determining that the third origin is unrepresented in the plurality of other origins, sending, by the browser, a pre-access request to the first origin, the pre-access request including an indication of the third origin and the second instruction to access the second resource, receiving, by the browser and from the first origin, an approval in response to the pre-access request, and in response to receiving the approval, accessing, by the browser, the second resource at the first origin based on the second instruction.

(M4) A method may be performed as described in any of paragraphs (M1) through (M3), and may further involve receiving, by the browser, a user input indicative of at least the first origin, receipt of the user input causing the browser to download the preauthorization data from the first origin.

(M5) A method may be performed as described in paragraph (M4), and may further involve receiving, by the browser, an additional user input indicative of a time period when the preauthorization data from the first origin is to be updated, determining, by the browser, that time elapsed since previous download of the preauthorization data from the first origin satisfies the time period, and in response to the time elapsed satisfying the time period, causing the browser to download updated preauthorization data from the first origin.

(M6) A method may be performed as described in any of paragraphs (M1) through (M5), and may further involve receiving, by the browser, additional data from a third origin, the additional data including a second instruction to access a second resource at the first origin, determining, by the browser, that the third origin is unrepresented in the plurality of other origins identified in the preauthorization data, in response to determining that the third origin is unrepresented in the plurality of other origins, sending, by the browser, a pre-access request to the first origin, the pre-access request including an indication of the third origin and the second instruction to access the second resource, receiving, by the browser and from the first origin, an denial in response to the pre-access request, and in response to receiving the denial, causing the browser to display an error indicative of access to the first origin, by the third origin, is denied.

(M7) A method may be performed as described in any of paragraphs (M1) through (M6), wherein the preauthorization data further identifies at least one Hypertext-Transfer-Protocol (HTTP) request method permitted to be used by at least one of the plurality of other origins to send instructions to the browser.

(M8) A method may be performed as described in any of paragraphs (M1) through (M7), wherein the second origin is identified in the preauthorization data using a domain.

(M9) A method may be performed as described in any of paragraphs (M1) through (M8), wherein the first origin is identified in the preauthorization data using a Uniform Resource Locator (URL).

The following paragraphs (S1) through (S9) describe examples of systems and devices that may be implemented in accordance with the present disclosure.

(S1) A system may comprise at least one processor and at least one computer-readable medium encoded with instructions which, when executed by the at least one processor, cause the system to receive, by a browser and from a first origin, preauthorization data identifying a plurality of other origins that are permitted to send instructions to the browser that cause the browser to access one or more resources at the first origin, determine, by the browser, that data received from a second origin includes a first instruction to access a first resource at the first origin, determine, by the browser, that the second origin is included among the plurality of other origins identified by the preauthorization data, and access, by the browser and based at least in part on the second origin being included among the plurality of other origins, the first resource at the first origin based on the first instruction.

(S2) A system may be configured as described in paragraph (S1), wherein the at least one computer-readable medium may be further encoded with additional instructions which, when executed by the at least one processor, further cause the system to in response to receiving the data from the second origin, determine that the preauthorization data for the first origin is unavailable at the browser, cause the browser to download of the preauthorization data from the first origin, and store the preauthorization data in a memory of the system on which the browser is being accessed.

(S3) A system may be configured as described in paragraph (S1) or paragraph (S2), wherein the at least one computer-readable medium may be further encoded with additional instructions which, when executed by the at least one processor, further cause the system to receive, by the browser, additional data from a third origin, the additional data including a second instruction to access a second resource at the first origin, determine, by the browser, that the third origin is unrepresented in the plurality of other origins identified in the preauthorization data, in response to determining that the third origin is unrepresented in the plurality of other origins, send, by the browser, a pre-access request to the first origin, the pre-access request including an indication of the third origin and the second instruction to access the second resource, receive, by the browser and from the first origin, an approval in response to the pre-access request, and in response to receiving the approval, access, by the browser, the second resource at the first origin based on the second instruction.

(S4) A system may be configured as described in any of paragraphs (S1) through (S3), wherein the at least one computer-readable medium may be further encoded with additional instructions which, when executed by the at least one processor, further cause the system to receive, by the browser, a user input indicative of at least the first origin, receipt of the user input causing the browser to download the preauthorization data from the first origin.

(S5) A system may be configured as described in paragraph (S4), wherein the at least one computer-readable medium may be further encoded with additional instructions which, when executed by the at least one processor, further cause the system to receive, by the browser, an additional user input indicative of a time period when the preauthorization data from the first origin is to be updated, determine, by the browser, that time elapsed since previous download of the preauthorization data from the first origin satisfies the time period, and in response to the time elapsed satisfying the time period, cause the browser to download updated preauthorization data from the first origin.

(S6) A system may be configured as described in any of paragraphs (S1) through (S5), wherein the at least one computer-readable medium may be further encoded with additional instructions which, when executed by the at least one processor, further cause the system to receive, by the browser, additional data from a third origin, the additional data including a second instruction to access a second resource at the first origin, determine, by the browser, that the third origin is unrepresented in the plurality of other origins identified in the preauthorization data, in response to determining that the third origin is unrepresented in the plurality of other origins, send, by the browser, a pre-access request to the first origin, the pre-access request including an indication of the third origin and the second instruction to access the second resource, receive, by the browser and from the first origin, an denial in response to the pre-access request, and in response to receiving the denial, cause the browser to display an error indicative of access to the first origin, by the third origin, is denied.

(S7) A system may be configured as described in any of paragraphs (S1) through (S6), wherein the preauthorization data further identifies at least one Hypertext-Transfer-Protocol (HTTP) request method permitted to be used by at least one of the plurality of other origins to send instructions to the browser.

(S8) A system may be configured as described in any of paragraphs (S1) through (S7), wherein the second origin is identified in the preauthorization data using a protocol scheme and a domain used to access the resources at the first origin.

(S9) A system may be configured as described in any of paragraphs (S1) through (S8), wherein the first origin is identified in the preauthorization data using a Uniform Resource Locator (URL).

The following paragraphs (CRM1) through (CRM9) describe examples of computer-readable media that may be implemented in accordance with the present disclosure.

(CRM1) At least one non-transitory computer-readable medium may be encoded with instructions which, when executed by at least one processor of a computing system, may cause the computing system to receive, by a browser and from a first origin, preauthorization data identifying a plurality of other origins that are permitted to send instructions to the browser that cause the browser to access one or more resources at the first origin, determine, by the browser, that data received from a second origin includes a first instruction to access a first resource at the first origin, determine, by the browser, that the second origin is included among the plurality of other origins identified by the preauthorization data, and access, by the browser and based at least in part on the second origin being included among the plurality of other origins, the first resource at the first origin based on the first instruction.

(CRM2) At least one non-transitory computer-readable medium may be configured as described in paragraph (CRM1), and may be further encoded with additional instructions which, when executed by the at least one processor, further cause the computing system to in response to receiving the data from the second origin, determine that the preauthorization data for the first origin is unavailable at the browser, cause the browser to download of the preauthorization data from the first origin, and store the preauthorization data in a memory of the system on which the browser is being accessed.

(CRM3) At least one non-transitory computer-readable medium may be configured as described in paragraph (CRM1) or paragraph (CRM2), and may be further encoded with additional instructions which, when executed by the at least one processor, further cause the computing system to receive, by the browser, additional data from a third origin, the additional data including a second instruction to access a second resource at the first origin, determine, by the browser, that the third origin is unrepresented in the plurality of other origins identified in the preauthorization data, in response to determining that the third origin is unrepresented in the plurality of other origins, send, by the browser, a pre-access request to the first origin, the pre-access request including an indication of the third origin and the second instruction to access the second resource, receive, by the browser and from the first origin, an approval in response to the pre-access request, and in response to receiving the approval, access, by the browser, the second resource at the first origin based on the second instruction.

(CRM4) At least one non-transitory computer-readable medium may be configured as described in any of paragraphs (CRM1) through (CRM3), and may be further encoded with additional instructions which, when executed by the at least one processor, further cause the computing system to receive, by the browser, a user input indicative of at least the first origin, receipt of the user input causing the browser to download the preauthorization data from the first origin.

(CRM5) At least one non-transitory computer-readable medium may be configured as described in paragraph (CRM4), and may be further encoded with additional instructions which, when executed by the at least one processor, further cause the computing system to receive, by the browser, an additional user input indicative of a time period when the preauthorization data from the first origin is to be updated, determine, by the browser, that time elapsed since previous download of the preauthorization data from the first origin satisfies the time period, and in response to the time elapsed satisfying the time period, cause the browser to download updated preauthorization data from the first origin.

(CRM6) At least one non-transitory computer-readable medium may be configured as described in any of paragraphs (CRM1) through (CRM5), and may be further encoded with additional instructions which, when executed by the at least one processor, further cause the computing system to receive, by the browser, additional data from a third origin, the additional data including a second instruction to access a second resource at the first origin, determine, by the browser, that the third origin is unrepresented in the plurality of other origins identified in the preauthorization data, in response to determining that the third origin is unrepresented in the plurality of other origins, send, by the browser, a pre-access request to the first origin, the pre-access request including an indication of the third origin and the second instruction to access the second resource, receive, by the browser and from the first origin, an denial in response to the pre-access request, and in response to receiving the denial, cause the browser to display an error indicative of access to the first origin, by the third origin, is denied.

(CRM7) At least one non-transitory computer-readable medium may be configured as described in any of paragraphs (CRM1) through (CRM6), wherein the preauthorization data further identifies at least one Hypertext-Transfer-Protocol (HTTP) request method permitted to be used by at least one of the plurality of other origins to send instructions to the browser.

(CRM8) At least one non-transitory computer-readable medium may be configured as described in any of paragraphs (CRM1) through (CRM7), wherein the second origin is identified in the preauthorization data using a protocol scheme and a domain used to access the resources at the first origin.

(CRM9) At least one non-transitory computer-readable medium may be configured as described in any of paragraphs (CRM1) through (CRM8), wherein the first origin is identified in the preauthorization data using a Uniform Resource Locator (URL).

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising,"

or "having," "containing," "involving," and variations thereof herein, is meant to encompass the items listed thereafter and equivalents thereof as well as additional items.

What is claimed is:

1. A method, comprising:

receiving, by a browser and from a first origin, preauthorization data identifying a plurality of other origins that are permitted to send instructions to the browser that cause the browser to access one or more resources at the first origin;

determining, by the browser, that data received from a second origin includes a first instruction to access a first resource at the first origin;

determining, by the browser, that the second origin is included among the plurality of other origins identified by the preauthorization data; and accessing, by the browser and based at least in part on the second origin being included among the plurality of other origins, the first resource at the first origin based on the first instruction;

receiving, by the browser, additional data from a third origin, the additional data including a second instruction to access a second resource at the first origin;

determining, by the browser, that the third origin is unrepresented in the plurality of other origins identified in the preauthorization data;

in response to determining that the third origin is unrepresented in the plurality of other origins, sending, by the browser, a pre-access request to the first origin, the pre-access request including an indication of the third origin and the second instruction to access the second resource;

receiving, by the browser and from the first origin, an approval in response to the preaccess request; and in response to receiving the approval, accessing, by the browser, the second resource at the first origin based on the second instruction.

2. The method of claim 1, further comprising:

in response to receiving the data from the second origin, determining that the preauthorization data for the first origin is unavailable at the browser;

causing the browser to download of the preauthorization data from the first origin; and storing the preauthorization data in a memory of a computing device on which the browser is being accessed.

3. The method of claim 1, further comprising:

receiving, by the browser, a user input indicative of at least the first origin, receipt of the user input causing the browser to download the preauthorization data from the first origin.

4. The method of claim 3, further comprising:

receiving, by the browser, an additional user input indicative of a time period when the preauthorization data from the first origin is to be updated;

determining, by the browser, that time elapsed since previous download of the preauthorization data from the first origin satisfies the time period; and in response to the time elapsed satisfying the time period, causing the browser to download updated preauthorization data from the first origin.

5. The method of claim 1, wherein the preauthorization data further identifies at least one Hypertext-Transfer-Protocol (HTTP) request method permitted to be used by at least one of the plurality of other origins to send instructions to the browser.

6. The method of claim 1, wherein the second origin is identified in the preauthorization data using a domain.

7. The method of claim 1, wherein the first origin is identified in the preauthorization data using a Uniform Resource Locator (URL).

8. A system, comprising:

at least one processor; and at least one computer-readable medium encoded with instructions which, when executed by the at least one processor, cause the system to:

receive, by a browser and from a first origin, preauthorization data identifying a plurality of other origins that are permitted to send instructions to the browser that cause the browser to access one or more resources at the first origin;

determine, by the browser, that data received from a second origin includes a first instruction to access a first resource at the first origin;

determine, by the browser, that the second origin is included among the plurality of other origins identified by the preauthorization data; and access, by the browser and based at least in part on the second origin being included among the plurality of other origins, the first resource at the first origin based on the first instruction;

receive, by the browser, additional data from a third origin, the additional data including a second instruction to access a second resource at the first origin, determine, by the browser, that the third origin is unrepresented in the plurality of other origins identified in the preauthorization data;

in response to determining that the third origin is unrepresented in the plurality of other origins, send, by the browser, a pre-access request to the first origin, the pre-access request including an indication of the third origin and the second instruction to access the second resource;

receive, by the browser and from the first origin, an approval in response to the preaccess request, and in response to receiving the approval, access, by the browser, the second resource at the first origin based on the second instruction.

9. The system of claim 8, wherein the at least one computer-readable medium is further encoded with additional instructions which, when executed by the at least one processor, further cause the system to:

in response to receiving the data from the second origin, determine that the preauthorization data for the first origin is unavailable at the browser;

cause the browser to download of the preauthorization data from the first origin; and store the preauthorization data in a memory of the system on which the browser is being accessed.

10. The system of claim 8, wherein the at least one computer-readable medium is further encoded with additional instructions which, when executed by the at least one processor, further cause the system to:

receive, by the browser, a user input indicative of at least the first origin, receipt of the user input causing the browser to download the preauthorization data from the first origin.

11. The system of claim 10, wherein the at least one computer-readable medium is further encoded with additional instructions which, when executed by the at least one processor, further cause the system to:

receive, by the browser, an additional user input indicative of a time period when the preauthorization data from the first origin is to be updated;

determine, by the browser, that time elapsed since previous download of the preauthorization data from the first origin satisfies the time period; and in response to the time elapsed satisfying the time period, cause the browser to download updated preauthorization data from the first origin.

12. The system of claim 8, wherein the preauthorization data further identifies at least one Hypertext-Transfer-Protocol (HTTP) request method permitted to be used by at least one of the plurality of other origins to send instructions to the browser.

13. The system of claim 8, wherein the second origin is identified in the preauthorization data using a domain.

14. The system of claim 8, wherein the first origin is identified in the preauthorization data using a Uniform Resource Locator (URL).

15. At least one non-transitory computer-readable medium encoded with instructions which, when executed by at least one processor of a system, cause the system to:

receive, by a browser and from a first origin, preauthorization data identifying a plurality of other origins that are permitted to send instructions to the browser that cause the browser to access one or more resources at the first origin;

determine, by the browser, that data received from a second origin includes a first instruction to access a first resource at the first origin;

determine, by the browser, that the second origin is included among the plurality of other origins identified by the preauthorization data;

access, by the browser and based at least in part on the second origin being included among the plurality of other origins, the first resource at the first origin based on the first instruction;

receive, by the browser, additional data from a third origin, the additional data including a second instruction to access a second resource at the first origin;

determine, by the browser, that the third origin is unrepresented in the plurality of other origins identified in the preauthorization data;

in response to determining that the third origin is unrepresented in the plurality of other origins, send, by the browser, a pre-access request to the first origin, the pre-access request including an indication of the third origin and the second instruction to access the second resource;

receive, by the browser and from the first origin, an approval response to the preaccess request; and in response to receiving the approval, access, by the browser, the second resource at the first origin based on the second instruction.

16. The at least one non-transitory computer-readable medium of claim 15, further encoded with additional instructions which, when executed by the at least one processor, further cause the system to:

in response to receiving the data from the second origin, determine that the preauthorization data for the first origin is unavailable at the browser;

cause the browser to download of the preauthorization data from the first origin; and store the preauthorization data in a memory of the system on which the browser is being accessed.

* * * * *